(12) United States Patent
Robertson

(10) Patent No.: US 7,311,364 B2
(45) Date of Patent: Dec. 25, 2007

(54) ELECTRIC TRAILER BRAKE CONTROLLER

(75) Inventor: Charles L. Robertson, Horton, AL (US)

(73) Assignee: Hayes Brake Controller Company, LLC, Arab, AL (US)

( * ) Notice: Subject to any disclaimer, the term of this patent is extended or adjusted under 35 U.S.C. 154(b) by 0 days.

(21) Appl. No.: 11/048,579

(22) Filed: Feb. 1, 2005

(65) Prior Publication Data

US 2005/0127747 A1     Jun. 16, 2005

Related U.S. Application Data

(63) Continuation-in-part of application No. 10/962,163, filed on Oct. 8, 2004.

(60) Provisional application No. 60/509,974, filed on Oct. 9, 2003.

(51) Int. Cl.
    *B60T 8/16* (2006.01)
(52) U.S. Cl. .......................... 303/7; 303/20
(58) Field of Classification Search .............. 303/7, 303/20, 123, 127, 24.1, 124; 188/112, 3; 701/70; 340/438
    See application file for complete search history.

(56) References Cited

U.S. PATENT DOCUMENTS

| | | | |
|---|---|---|---|
| 3,738,710 A | 6/1973 | Pokrinchak et al. | |
| 3,771,840 A | 11/1973 | Hubbard | |
| 3,780,832 A | 12/1973 | Marshall | |
| 3,819,234 A | 6/1974 | Couchois et al. | |
| 4,084,859 A | 4/1978 | Bull et al. | |
| 4,398,252 A | 8/1983 | Frait | |
| 4,524,312 A | 6/1985 | Matsumoto et al. | |
| 4,721,344 A | 1/1988 | Frait et al. | |
| 4,726,627 A | 2/1988 | Frait et al. | |
| 4,856,850 A | 8/1989 | Aichele et al. | |
| 5,050,937 A | 9/1991 | Eccleston | |
| 5,149,176 A | 9/1992 | Eccleston | |
| 5,352,028 A | 10/1994 | Eccleston | |
| 5,615,930 A | 4/1997 | McGrath et al. | |
| 5,620,236 A | 4/1997 | McGrath et al. | |
| 5,741,048 A | 4/1998 | Eccleston | |
| 5,782,542 A | 7/1998 | McGrath et al. | |
| 5,785,393 A | 7/1998 | McGrath et al. | |
| 5,800,025 A | 9/1998 | McGrath et al. | |
| 5,949,147 A | 9/1999 | McGrath et al. | |
| 6,012,780 A | 1/2000 | Duvernay | |
| 6,039,410 A | 3/2000 | Robertson et al. | |
| 6,068,352 A | 5/2000 | Kulkarni et al. | |
| 6,325,466 B1 | 12/2001 | Robertson et al. | |
| 6,367,588 B1 | 4/2002 | Robertson et al. | |
| 6,445,993 B1 | 9/2002 | Eccleston et al. | |
| 6,532,419 B1 | 3/2003 | Begin et al. | |
| 6,557,952 B1 | 5/2003 | Robertson et al. | |
| 6,615,125 B2 | 9/2003 | Eccleston et al. | |
| 6,619,759 B2 * | 9/2003 | Bradsen et al. ................. | 303/7 |
| 6,655,752 B2 | 12/2003 | Robertson et al. | |
| 6,837,551 B2 * | 1/2005 | Robinson et al. .............. | 303/7 |

(Continued)

*Primary Examiner*—Chris Schwartz
(74) *Attorney, Agent, or Firm*—MacMillan, Sobanski & Todd, LLC

(57) ABSTRACT

A micro processor based electric brake controller includes a multi-axis accelerometer that senses deceleration of a towing vehicle along a plurality of directional axes. The controller also includes a microprocessor that is responsive to the sensed decelerations to supply power to trailer brakes that is a function of the deceleration.

26 Claims, 18 Drawing Sheets

U.S. PATENT DOCUMENTS

| | | |
|---|---|---|
| 6,845,851 B1 * | 1/2005 | Donaldson et al. ............ 303/7 |
| 7,058,499 B2 * | 6/2006 | Kissel ........................ 701/70 |
| 2003/0038534 A1 * | 2/2003 | Barnett ........................ 303/7 |
| 2003/0168908 A1 * | 9/2003 | Robinson et al. .............. 303/7 |
| 2005/0077780 A1 * | 4/2005 | Robertson ...................... 303/7 |

* cited by examiner

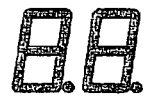 Displayed at power up to check all segments

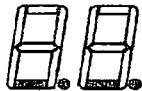 Level - Used at the factory only

 Open Connection, trailer not connected

 Calibration Complete, Used at factory only

 Short Circuit, output is shorted to ground.

 Calibration Error, Used at factory only

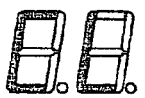 Current Limit, current is higher than rating

 100% Test Complete, Used at factory only

 Slide Fault, Slide SW is on all the time

 Error - Both cal. & test jumpers are on

 Remote Fault, remote circuit fault

 Display off or controller asleep

 Blue Fault, blue wire is hot and output is off

 Percent Power display mode 

 Up (+) Fault, Up button stuck on

 Voltage display mode 

 Down (-) Fault, "-" button stuck on

 Current Display mode (Amps) 

 Hazard Flashers on

FIG. 7

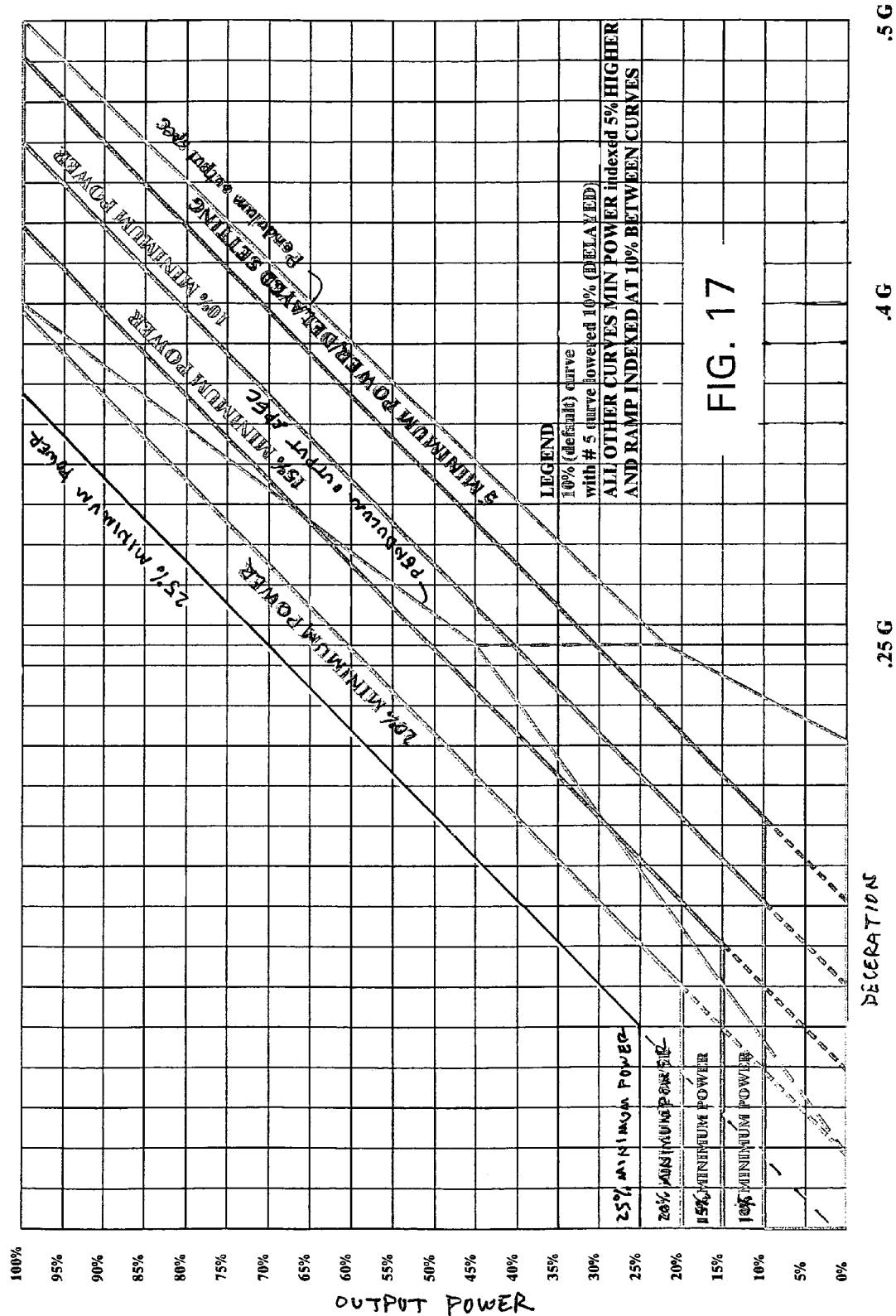

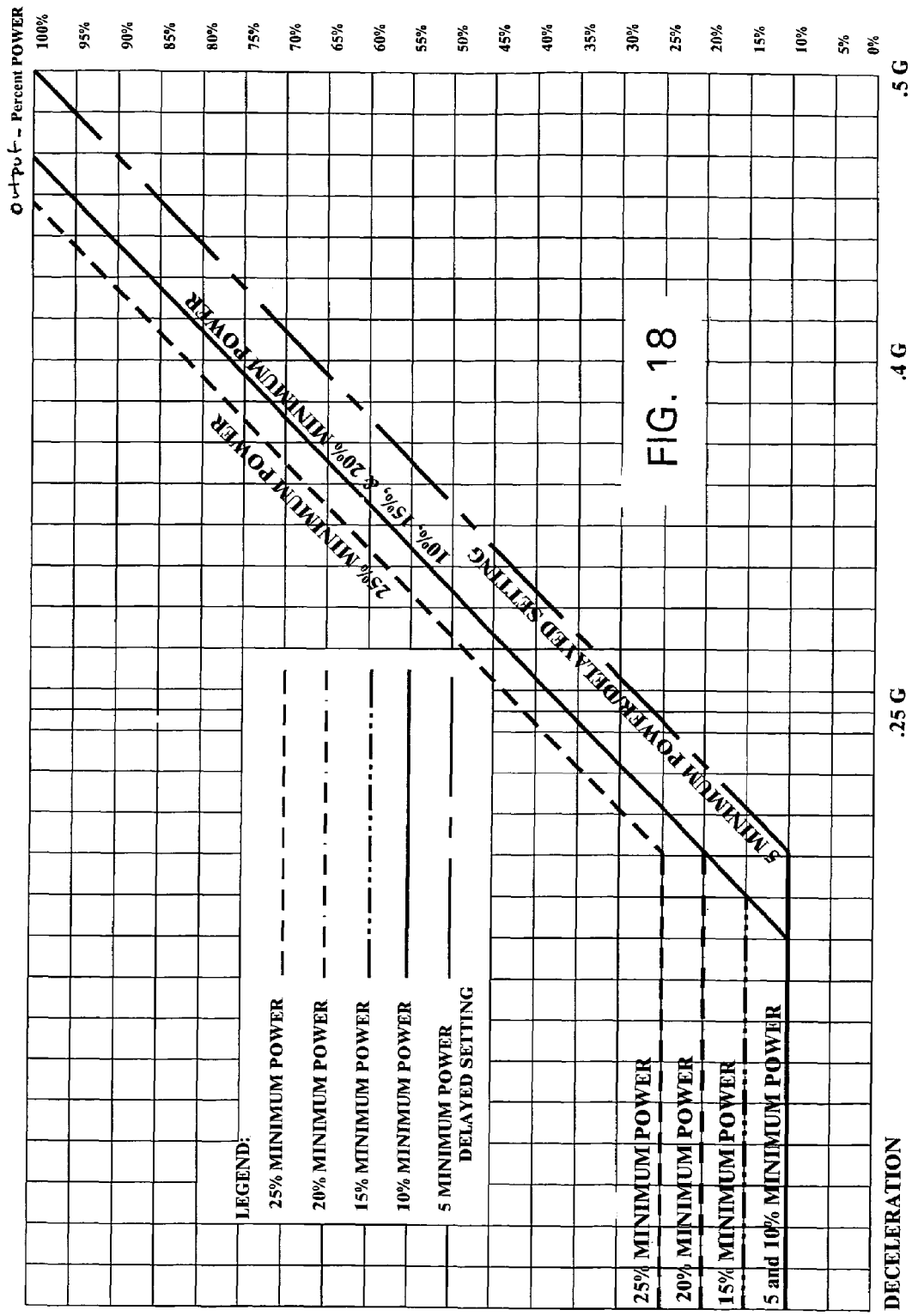

ELECTRIC TRAILER BRAKE CONTROLLER

CROSS REFERENCE TO RELATED APPLICATIONS

This application is a Continuation-in-Part Application of U.S. Utility patent application Ser. No. 10/962,163, filed Oct. 8, 2004 and claims the benefit of U.S. Provisional Application No. 60/509,974, filed Oct. 9, 2003, the disclosure of which is incorporated herein by reference.

BACKGROUND OF INVENTION

This invention relates in general to controllers for electric wheel brakes used on trailers and in particular to an improved controller for such electric wheel brake controllers.

Towed vehicles, such as recreational and utility trailers that are towed by automobiles and small trucks, are commonly provided with electric wheel brakes. The electric wheel brakes generally include a pair of brake shoes which, when actuated, frictionally engage a brake drum. An electromagnet is mounted on one end of a lever to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet. This electric current can be relatively large. For example, the electric wheel brakes on a two wheeled trailer can draw six amperes of current when actuated and the electric wheel brakes on a four wheeled trailer can draw 12 amperes of current.

Automotive industry standards require that electrically-actuated vehicle wheel brakes be driven against the ground potential of the vehicle power supply. Accordingly, one end of each of the towed vehicle wheel brake electromagnets is electrically connected to the towed vehicle ground and the towed vehicle ground is electrically connected to the towing vehicle ground. The other end of each of the wheel brake electromagnets is electrically connected through an electric wheel brake controller to the towing vehicle power supply.

Various electric brake controllers for towed vehicle electric brakes are known in the art. For example, a variable resistor, such as a rheostat, can be connected between the towing vehicle power supply and the brake electromagnets. Such an actuator is disclosed in U.S. Pat. No. 3,740,691. The towing vehicle operator manually adjusts the variable resistor setting to vary the amount of current supplied to the brake electromagnets and thereby control the amount of braking force developed by the towed vehicle wheel brakes.

It also is known to include an integrating circuit in an electric wheel brake controller. When the towing vehicle brakes are applied, a signal is sent to the integrating circuit. The integrating circuit generates a continually increasing voltage which is applied to the electric wheel brakes. The longer the towing vehicle brakes are applied, the more brake torque is generated by the actuator. A manually adjustable resistor typically controls the rate of integration. One such actuator is disclosed in U.S. Pat. No. 3,738,710.

Also known in the art are more sophisticated electric wheel brake controllers which include electronic circuitry to automatically supply current to the towed vehicle brake electromagnets that is proportional to the towing vehicle deceleration when the towing vehicle brakes are applied. Such electronic wheel brake controllers typically include a sensing unit that automatically generates a brake control signal corresponding to the desired braking effort. For example, the sensing unit can include a pendulum which is displaced from a rest position when the towing vehicle decelerates and an electronic circuit which generates a brake control signal that is proportional to the amount of pendulum displacement. One such unit is disclosed in U.S. Pat. No. 4,721,344. Alternately, the hydraulic pressure in the towing vehicle's braking system or the pressure applied by the vehicle operator's foot to the towing vehicle's brake pedal can be sensed to generate the brake control signal. An example of a controller which senses the towing vehicle brake pressure to generate the brake control signal is disclosed in U.S. Pat. No. 4,398,252.

Known electronic wheel brake controllers also usually include an analog pulse width modulator. The input of the pulse width modulator is electrically connected to the sensing unit and receives the brake control signal therefrom. The pulse width modulator is responsive to the brake control signal to generate an output signal comprising a fixed frequency pulse train. The pulse width modulator varies the duty cycle of the pulse train in direct proportion to the magnitude of the brake control signal. Thus, the duty cycle of the pulse train corresponds to the amount of braking effort desired.

Electronic wheel brake controllers further include an output stage which is electrically connected to the output of the pulse width modulator. The output stage typically has one or more power transistors which are connected between the towing vehicle power supply and the towed vehicle brake electromagnets. The power transistors, which are usually Field Effect Transistors (FET's), function as an electronic switch for supplying electric current to the towed vehicle brakes. The output stage may also include a driver circuit which electrically couples the output of the pulse width modulator to the gates of the FET's.

The output stage is responsive to the pulse width modulator output signal to switch the power transistors between conducting, or "on", and non-conducting, or "off", states. As the output transistors are switched between their on and off states in response to the modulator output signal, the brake current is divided into a series of pulses. The power supplied to the towed vehicle brakes and the resulting level of brake application are directly proportional to the duty cycle of the modulator generated output signal.

It is also known to include an manual override control with electronic wheel brake controllers. Such manual override controls typically include a potentiometer that is actuated by a sliding control lever or pushbutton that is moved by the vehicle driver. The potentiometer provides a manual brake control signal to the input of the analog pulse width modulator. The controllers are usually designed to discriminate between the manual brake control signal and the brake control signal supplied by the sensing unit and to respond to the greater signal.

SUMMARY

The present invention relates to an improved controller for electric wheel brakes of towed vehicles.

As described above, rather sophisticated known controllers for electric trailer brakes have been developed. However, know controllers tend to be non-linear devices and usually operate within operating parameter limits preset by the manufacturer. Accordingly, it would be desirable to provide linear operation and a capability for the user to adjust operating parameters limits along with adding further innovative features to brake controllers. Know controllers also need to be compensated for mounting orientations within the towing vehicle. Therefore, it also would be desirable for a brake controller to be operable independently of its mounting orientation.

The present invention contemplates a trailer brake controller that includes a multi-axis accelerometer for generating a plurality of deceleration signals. The controller also includes a microprocessor connected to the accelerometer that is responsive to the deceleration signals to generate an output brake actuation signal that is related to the deceleration signals. The controller further includes at least one pushbutton connected to the microprocessor that is operative to change selected operating parameters of the microprocessor.

The invention contemplates using either a two axis accelerometer or a three axis accelerometer is utilized to generate the deceleration signals. The microprocessor is operative to combine the deceleration signals to produce the brake actuation signal. The brake controller output power is limited by minimum and maximum values. Accordingly, the invention also contemplates that the controller includes a pair of pushbuttons that are selectively operative to select the minimum and maximum brake controller output power values.

The invention further contemplates that the microprocessor includes an internal ROM that stores the coding for an algorithm that is utilized to operate the controller. The controller microprocessor further includes an internal EEPROM that is connected to the microprocessor and stores any operating parameters selected by manipulation of the pushbuttons.

The invention also contemplates that the controller includes a programmable current sensing power switch that is adapted to be connected between a power supply and a set of trailer brake coils. The power switch is connected to an output pin of the microprocessor and responsive to the brake control signal to supply a current that is a function of the brake control signal to the trailer brake coils. The power switch is also connected to a current feedback port of the microprocessor and the microprocessor is operative to monitor the current being supplied to the trailer brake coils. The microprocessor is further operative, upon the brake coil current exceeding a predetermined threshold, to cause the power switch to change to a non-conducting state for a predetermined period of time. The controller also includes a digital display connected to the microprocessor. The microprocessor is operative to monitor parameters within the trailer brake circuit and, upon detection of a problem, to illuminate the display to inform the towing vehicle operator of the problem.

Various objects and advantages of this invention will become apparent to those skilled in the art from the following detailed description of the preferred embodiment, when read in light of the accompanying drawings.

BRIEF DESCRIPTION OF DRAWINGS

FIG. 7 illustrates the visual display codes available for the controller shown in FIG. 1.

FIG. 17 illustrates the adjustment of the output power curves for the brake controllers shown in FIGS. 14 and 15.

FIG. 18 illustrates an alternate embodiment of the output power curves shown in FIG. 17.

DETAILED DESCRIPTION

Figure 1:
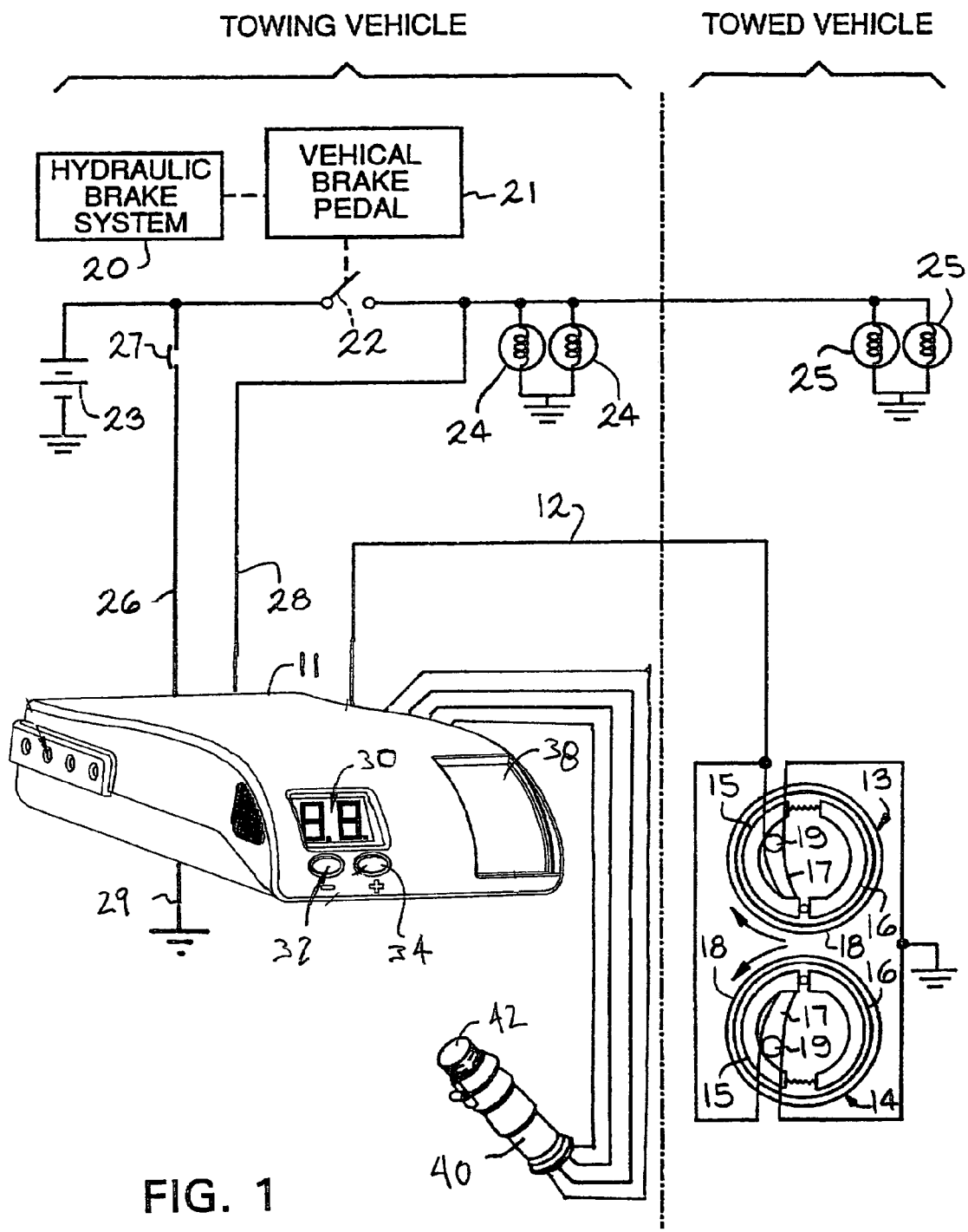
FIG. 1 is a schematic circuit drawing of a brake controller that is in accordance with the present invention.

Referring now to the drawings, there is shown in FIG. 1 a schematic diagram illustrating an electric brake system for a towed vehicle (not shown), shown generally at 10, which utilizes an electronic brake controller 11 embodying the principles of the present invention. The brake controller 11 is typically located in a towing vehicle (not shown), usually being mounted beneath the towing vehicle dashboard. When actuated, the controller 11 functions to supply an electric current through a first line 12 to energize electric brakes 13 and 14 which brake the wheels of the towed vehicle (not shown).

The electric brakes 13 and 14 each include a pair of brake shoes 15 and 16 which, when actuated by a lever 17, are expanded into contact with a brake drum 18 for braking the wheels of the towed vehicle. A separate electromagnet 19 is mounted on an end of each of the brake actuating levers 17. Each electromagnet 19 is positioned to abut the generally flat side of the brake drum 18. As an electric current is passed through each of the electromagnets 19, the electromagnets 19 are drawn into contact with the brake drums 18 and the resulting drag pivots the levers 17 to engage the brake shoes 15 and 16 in a conventional manner. It will be appreciated that, while FIG. 1 shows two sets of brakes 13 and 14, the invention also can be applied to towed vehicles having more than two sets of brakes.

The towing vehicle typically includes a conventional hydraulic brake system 20 which is actuated when a brake pedal 21 is depressed by a vehicle driver. The brake pedal 21 is coupled to a brake light switch 22. When the brake pedal 21 is depressed, the switch 22 is closed and power from a vehicle power supply 23, shown as a storage battery in FIG. 1, is supplied to one or more towing vehicle brake lights 24 and one or more towed vehicle brake lights 25. The vehicle power supply 23 is also connected by a second line 26 through a circuit breaker 27 to the controller 11. Power is continuously supplied to the controller 11 through the second line 26. It will be appreciated that, while a circuit breaker 27 is shown in FIG. 1, a fuse or other over-current protection device can be used. A third line 28 connects the brake light side of the brake light switch 22 to the controller 11. Thus, power also is supplied through the third line 28 to the controller 11 when the brake light switch 22 is closed. The controller is connected to the towing vehicle ground by a fourth line 29.

The controller 11 further includes a two digit seven segment digital display 30 and a pair of setup/adjustment pushbuttons 32 and 34 mounted upon the front surface of the controller housing. The digital display 30 provides visual feedback concerning operation of the controller 11 to the towing vehicle driver, as will be described below. The pushbuttons 32 and 34 permit adjustment of the controller 11 operation by the driver, as also will be described below.

Figure 2:
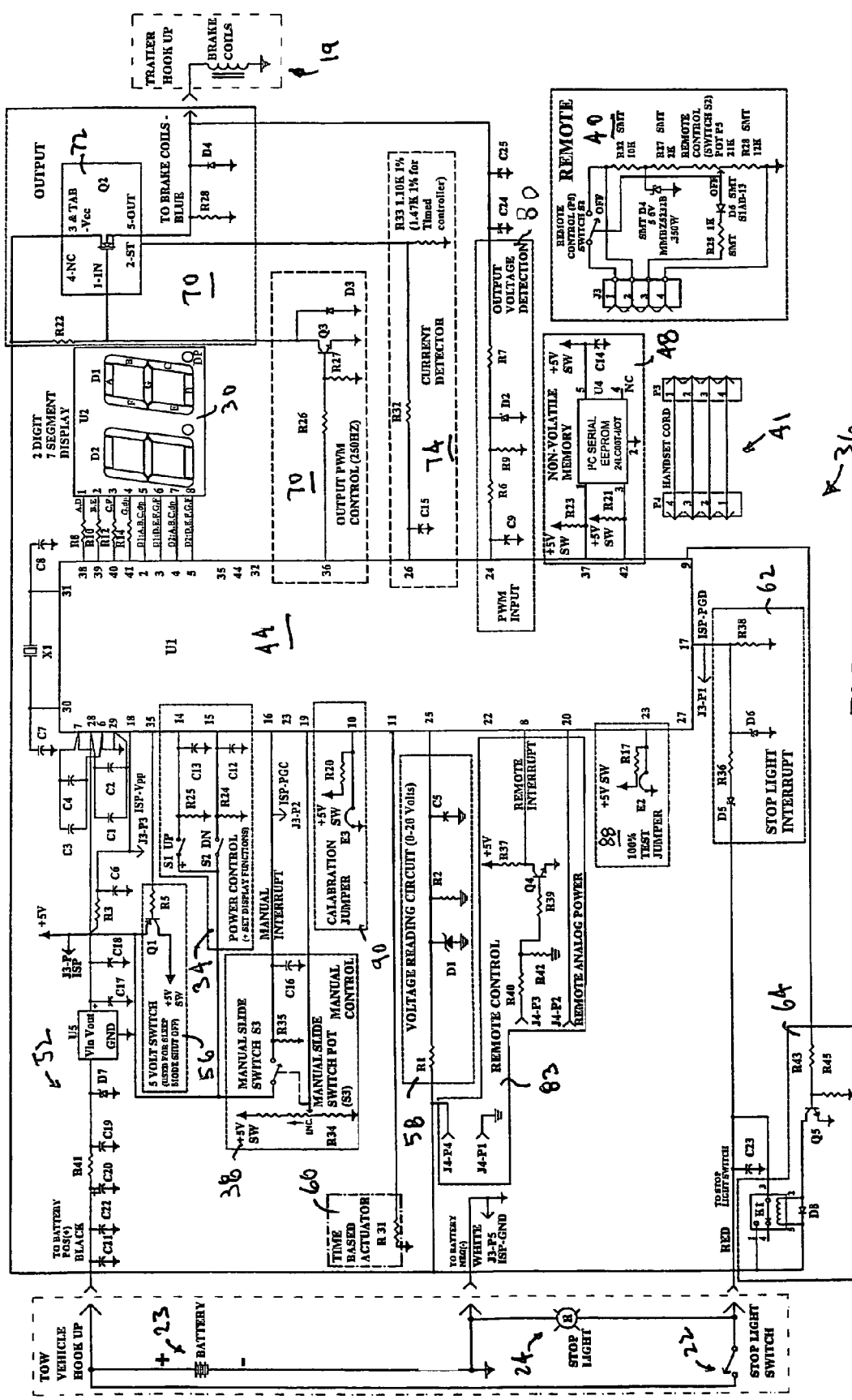
FIG. 2 is a circuit diagram for the brake controller shown in FIG. 1.

The brake controller 11 shown in FIG. 1 is a time based controller that operates with a time based circuit 36 shown in FIG. 2. The controller 11 is activated upon closure of the brake light switch 22 when the towing vehicle brake pedal 21 is depressed. Upon activation, the controller 11 supplies an initial current to the towed vehicle brakes 13 and 14. The electric current to the brakes is then continuously increased, or "ramped up", to a preset maximum value while the brake pedal 21 remains depressed. Upon release of the brake pedal 21, the electric current through line 12 is interrupted and the towed vehicle brakes 13 and 14 are released.

In some instances, it may be desirable to actuate only the towed vehicle brakes 13 and 14. This may be desirable, for example, to stabilize the towed vehicle against oscillations or swinging caused by strong side winds. Therefore, the brake controller 11 also includes a manual mode of operation. Accordingly, a manual slide lever 38 is provided on the electronic controller 11 to allow the vehicle driver to actuate the towed vehicle brakes 13 and 14 without applying the towing vehicle brakes. Moving the manual slide lever 38 to the left in FIG. 1 initiates the manual mode of operation. The amount of electric current supplied to the towed vehicle brakes 13 and 14 is proportional to the displacement of the manual slide lever 38. If the manual slide lever 38 is moved while the brake pedal 21 is depressed, the manual operating mode overrides the automatic operating mode.

The controller 11 may also be provided with an optional hand held manual remote switch 40 that is connected to the controller 111 by a cable 41 having quick disconnect connectors at each end. The manual remote control 40 includes a pushbutton 42 which can be used to initiate the manual mode of operation. Upon pressing the pushbutton 42, the manual remote control 40 functions the same as the manual switch 38 to actuate the towed vehicle brakes with the applied braking force being proportional to the displacement of the pushbutton 42. The remote manual control 40 is described in U.S. Pat. No. 6,557,952, which is incorporated herein by reference. When either the manual slide lever 38 or the manual remote control 40 are pressed, the towing vehicle and towed vehicle brake lights 24 and 25 are illuminated.

Referring now to FIG. 2, the controller circuit 36 includes a Micro-Processor Unit (MPU) 44 that is programmed to generate a brake control signal upon closure of the brake light switch 22. In the preferred embodiment, the MPU 44 is a PIC16F7X CMOS FLASH-base 8-bit micro-controller supplied by Microchip Technology Inc.; however, the invention also may be practiced with other similar microprocessors. The MPU 44 includes an internal Read Only Memory (ROM) that permanently stores coding for a controller operating algorithm within the unit. The algorithm provides the instructions for the controller operation during a brake application. The MPU 44 is connected to an external memory 46 that includes an Electrically Erasable Programmable Read Only Memory EEPROM 48. The EEPROM 48 stores operational settings for the controller 11 as provided by the manufacturer or input by the driver by means of the pushbuttons 32 and 34. The EEPROM 48 retains the stored information during power interruptions, such as would occur when the battery is disconnected during servicing of the towing vehicle. The MPU 44 is also connected to a conventional oscillator circuit 50 that sets the clock rate for the operation of the unit.

A conventional voltage regulator circuit 52 is connected between the vehicle power supply 23 and the MPU 44. The voltage regulator circuit 52 provides a constant five volts to MPU 44 and other components in the circuit 36. Additionally, a tap 53 at the input to the regulator circuit 52 provides battery voltage VBAT+ directly to selected components of the controller circuit 36, as shown in FIG. 2. A plurality of capacitors 54 connected in parallel between the voltage input port of the MPU 44 and ground provide EMI and RMI suppression for the controller voltage supply.

The controller circuit 36 also includes a sleep mode, or standby, circuit 56 connected between the regulator circuit 52 and other selected circuits. The controller 11 goes to sleep in 5 minutes if the MPU 44 has detected an open circuit (no trailer). It also goes to sleep in 30 minutes if a load (trailer) is detected and no braking has occurred and no manual or remote input has occurred or neither of the push buttons has been depressed. The seep mode minimizes power usage by limiting current draw and thus prevents running the towing vehicle battery down during times the vehicle is not in use.

The standby circuit 56 includes an electronic switch, which in the preferred embodiment is a transistor Q1, that has a base terminal connected to a sleep mode output port of the MPU 44. The emitter of the transistor Q1 is connected to the output of the regulated power supply 52 while the collector is connected to selected electronic components of the controller 11. The sleep mode is activated upon expiration of a predetermined time period during which the controller 11 does not receive an input signal. As described above, in the preferred embodiment, the predetermined period for activating the sleep mode is 30 minutes; however, the invention also may be practiced utilizing other time periods. Upon actuation, the transistor Q1 is placed into a non-conducting state to prevent the supply of electricity to the selected components and thereby conserve the towing vehicle power supply 23 during periods of towing vehicle inactivity. Upon closure of the towing vehicle brake switch 22 or activation the manual brake controls 38 or 40, the electronic transistor Q1 is placed in a conducting state to supply electric power to the components connected to the collector of the switch. The interruptible voltage supplied by the standby circuit 42 is identified as SV5V in FIG. 2 and the following description.

The controller circuit 36 also includes a battery monitoring circuit 58 that is connected between the towing vehicle power supply 23 and a battery voltage monitoring input port on the MPU 44. The monitoring circuit 58 includes a Zener diode Z1 to limit the voltage applied to the MPU port and a filter capacitor C5. The MPU 44 uses the battery voltage received from the circuit 58 as a self-diagnostic tool. If a battery voltage is present at the MPU input pin, but no output voltage is generated when needed, the MPU 44 determines that a fault has occurred and disables itself while providing a visual warning signal via the digital display 30 to the towing vehicle driver.

An input selection circuit 60 is connected to operational mode port 61 on the MPU 44. As shown in FIG. 2, the input selection circuit 60 provides a connection of the associated MPU port through resistor R31 to ground, which indicates to the operating algorithm that the MPU 44 is to operate in a time based mode as described above. As also described above, the MPU 44 is activated upon closure of the towing vehicle stop light switch 22. As shown in FIG. 2, the third line 28, that connects the brake light side of the brake light switch 22 to the controller 11 in FIG. 1, is connected through a stop light interrupt circuit 62 to a stop cycle input port 63 of the MPU 44. The stop light interrupt circuit 62 includes a pair of Zener diodes to control the magnitude of the voltage applied to the MPU port 63. As shown in FIG. 2, the third line 28 from the brake light side of the stop light switch 22 also is connected to a manual stop light switch circuit 64. The manual stop light circuit is operative upon actuation of either of the manual slide lever 38 or the remote manual control pushbutton 42 to close a relay to connect the trailer stop light lamps 25 with the towing vehicle power supply 23 and thereby illuminate the trailer stop light lamps. The manual stop light switch circuit 64 is fully described in U.S. Pat. No. 6,325,466 which is incorporated herein by reference.

As will be described below, the MPU 44 is responsive to the stop cycle input port 63 going high to generate a Pulse Width Modulated PWM brake control signal at a brake control output port 66. The brake control output port 66 is connected by a brake control line 68 to an output power circuit 70. The output power circuit includes an electronic driver Q3 connected between the towing vehicle power supply voltage VBAT+ and ground. The driver Q3 is connected to the gate of a programmable current sensing high side power switch 72. In the preferred embodiment, an IR3310(S) that is available from International Rectifier Corp. is utilized for the switch 72; however, it will be appreciated that the invention also may be practiced with other power control devices, such as for example, a Field Effect Transistor (FET). The input terminal of the switch 72 is connected to the towing vehicle power supply voltage VBAT+ while the output terminal of the switch 72 is connected though the first line 12 to the towed vehicle brake coils 19. A pair of capacitors C24 and C25 are connected between the switch output terminal and ground to remove any spurious high frequency signals that may be superimposed upon the current being supplied to the bake coils 19. The power switch 72 includes a power MOSFET that is placed in a conducting state when the gate voltage exceeds an input voltage threshold value, $V_{iT}$, and placed in a non-conducting state when the gate voltage is less than the threshold $V_{iT}$. As shown in FIG. 2, the power MOSFET source is connected to the brake coils 19 while the MOSFET drain is connected to the vehicle power supply voltage VBAT+.

The power switch 72 also includes a small MOSFET (not shown) connected in parallel with power MOSFET that is operative to supply a feedback current that is proportional to the current flowing through the power MSOFET to the brake coils 19. The small MOSFET is connected to a current detection circuit 74 that includes a current feedback resistor R33. The voltage developed across the feedback resistor R33, that is proportional to the current being supplied to the brake coils 19 is applied to a current feedback port 76 of the MPU 44. If the voltage across the feedback resistor R33 exceeds a predetermined current shutdown threshold, $T_1$, an over-current condition exists and the MPU 44 will place the switch 72 in its non-conducting state for a predetermined time period. The MPU 44 will also provide a visual warning signal via the digital display 30 to the towing vehicle driver. The power switch 72 also includes temperature protection. If the temperature of the switch exceeds a temperature shutdown threshold, $T_{TEMP}$, the switch 72 will change to its non-conducting state. The switch 72 will remain in a non-conducting state for a predetermined time period to allow the switch to cool down. In the preferred embodiment the predetermined time period is 120 milliseconds to allow sufficient cooling time for all of the components that were subjected to the over-current condition. At the end of the time period, the MPU 44 will reset the switch 72, returning it to its conducting state. However, if the current and/or the temperature still exceeds the corresponding threshold, the power switch 72 will be returned to its non-conducting state for another predetermined time period. Thus, a potential thermal runway is avoided. The cycling of power switch 72 will continue until the over-current condition ceases.

The output terminal of the switch 72 also is connected to a voltage detection circuit 78 that includes a voltage divider 80 comprising a pair of resistors R7 and R9. The center tap of the voltage divider 80 is connected to a voltage feedback port 82 of the MPU 44. Thus, the voltage detection circuit provides a feedback voltage that is proportional to the brake coil voltage to the MPU 44. The MPU compares the feedback voltage to the desired output voltage to confirm that the controller 11 is operating satisfactorily. Upon detection of a voltage problem, the MPU 44 will provide a visual warning signal via the digital display 30 to the towing vehicle driver, such as for example, an output voltage appearing on the line 12 to the trailer brake coils 19 when none is requested.

The controller circuit 36 further includes a remote manual control circuit 83 that is optional. The circuit 83 includes a four wire connector J4 for connecting the remote manual control 40 to the MPU 44 via a handset cord (not shown). A first connector wire is connected to ground while a second wire is connected to the towing vehicle power supply tap VBAT+. A third wire is connected to a circuit wake up pin 84 of the MPU 44. When the wake up pin 84 goes high upon initial depression of the remote manual control pushbutton 42, the selected controller circuits connected to the sleep mode transistor Q1 are supplied power and the stop light lamps 25 of the towed vehicle are illuminated. A fourth connector wire is connected to a brake signal input pin 85 of the MPU 44 and provides a voltage that is proportional to the amount that the remote manual control pushbutton 42 is depressed. The remote manual control circuit 84 also is described in U.S. Pat. No. 6,557,952, which, as indicated above, has been incorporated herein by reference. If the controller circuit 36 is omitted, the circuit wake up pin 84 is left floating while the brake signal input pin 85 is held high by being connected through a resistor R37 to the regulated voltage supply (not shown).

A five wire connector 86 is included in the circuit 36 and connected to the MPU 44. The connector 86 is utilized for programming the MPU 44 at the manufacturing facility. A first removable jumper E2 is included in a test circuit 88 connected to the MPU 44. The first jumper E2 is inserted at the manufacturing facility and the controller 11 is then tested for satisfactory operation. Upon successfully completing the test, the jumper E2 is removed. A second removable jumper E3 is included in a calibration circuit 90. The second jumper E3 is inserted at the manufacturing facility and the controller is calibrated for the minimum and maximum displacement of the manual slide switch 38. The jumper E3 is then removed and the controller 11 is shipped to the sale outlet. The controller 11 further includes a noise suppression circuit 92 that filters the voltage SV5V supplied by the sleep mode switch Q1.

The operation of the time based controller 11 will now be described. The controller operation follows an algorithm that is stored in the MPU 44 and illustrated by the flow chart shown in FIG. 3. The algorithm is initiated in functional block 100 upon closure of the stop light switch 22 when the driver depresses the towing vehicle brake pedal 21. As described above, closure of the stop light switch 22 applies a voltage to the stop light interrupt circuit 62 which in turn takes the stop cycle input port 63 of the MPU 44 high. In response to the input port 63 going high, the MPU determines whether the controller 11 is in the sleep mode in decision block 102. If the controller 11 is in the sleep mode, the algorithm transfers to functional block 104 where the MPU 44 is turned fully on. Also, the sleep mode transistor Q1 is placed in a conducting state to apply the voltage SV5V to the selected circuit components. Additionally, a sleep counter is reset for eventual return to the sleep mode. The algorithm then advances to functional block 106. If, in decision block 102, the controller 11 is not in the sleep mode, the algorithm transfers directly to functional block 106.

In functional block 106 the MCU 44 begins generating a PWM brake control signal with a preset initial duty cycle. The brake control signal is applied to the output power circuit 70 where the power switch 72 is cycled between its conducting and non-conducting states to supply a PWM output current to the trailer brake coils 19. In the preferred embodiment, the frequency of the output current is 250 Hz; however, the invention also can be practiced with other output current frequencies. Also, in the preferred embodiment, the initial PWM duty cycle is selected such that the initial current supplied to the brake coils 19 will provide an average of 10% of the maximum power available from the controller 11. As before, it will be appreciated that the invention also may practiced with other initial duty cycles to provide a different initial power level to the brake coils 19.

The algorithm then advances to functional block 108 where a brake apply cycle counter is indexed. The algorithm continues to decision block 110 where the bake light switch 22 is again checked. If the brake light switch has opened, it is indicative that the driver has released the towing vehicle brakes. Accordingly, the algorithm transfers to functional block 112 where the MPU 44 terminates the brake control signal. Termination of the brake control signal places the power switch 72 in a non-conducting state and interrupts the current being supplied to the brake coils 19. Accordingly, the towed vehicle brakes are released. Because the braking cycle is ended, the brake application cycle counter is reset in functional block 112. The algorithm then exits through block 114.

Figure 4:
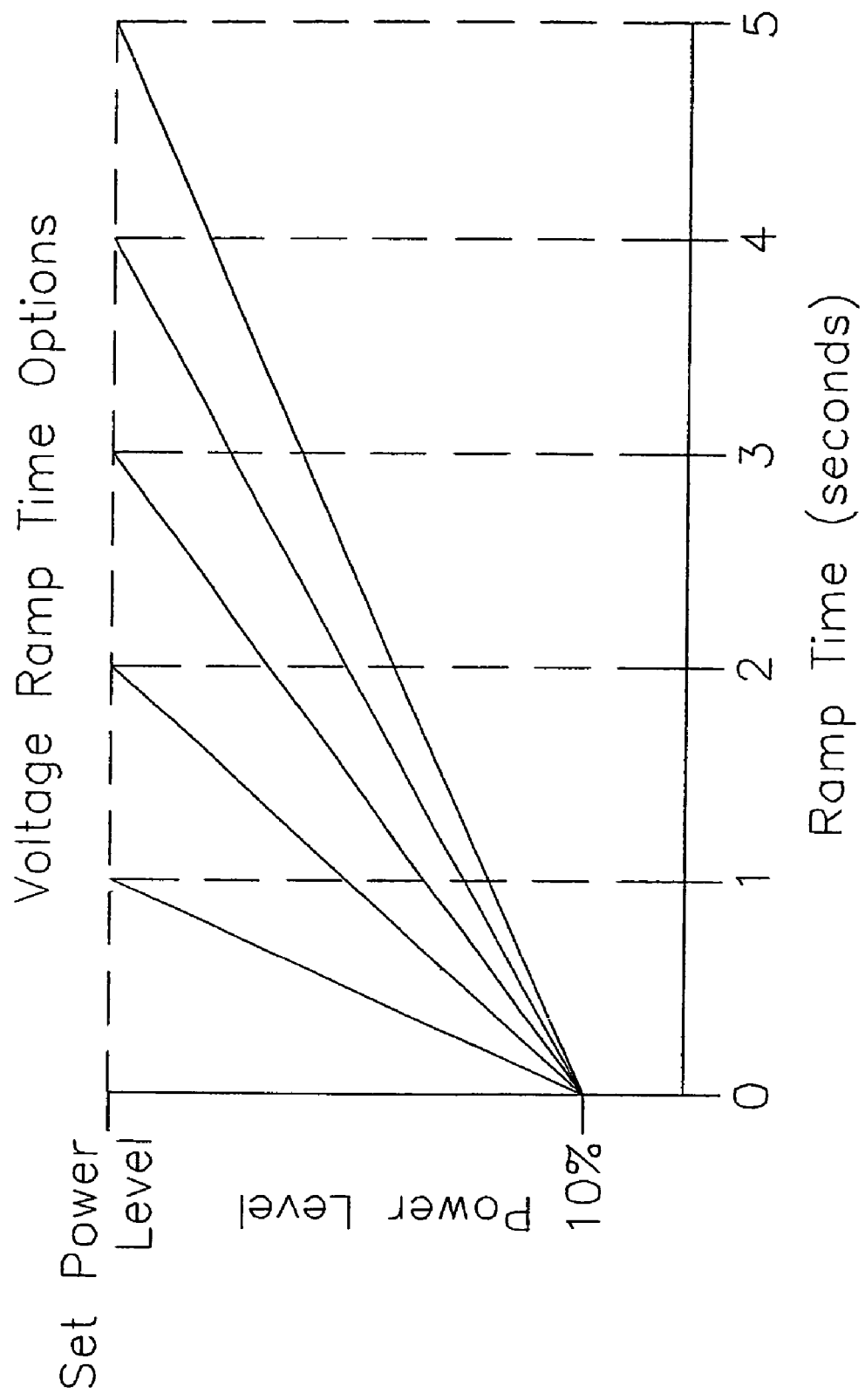
FIG. 4 is a graph illustrating programming options for the controller shown in FIG. 1.

If, in decision block 110, the brake light switch remains closed, the algorithm transfers to functional block 116 where the MPU 44 incrementally increases the brake control signal duty cycle to increase the current, and hence the power, being supplied to the brake coils 19. In the preferred embodiment, the power level continues to increase as long as the brake light switch 22 is held closed until the power reaches a maximum power level set by the driver up to 100% of the maximum power available, which is indicated by "99" upon the two digit display 30. A maximum power level of 50% is initially set at the manufacturing facility. The total elapsed time from the initial brake application to the attainment of maximum set power is referred to as a voltage time ramp. In the preferred embodiment, a voltage time ramp of three seconds is set at the manufacturing facility; however, as will be explained below, the driver may select other voltage time ramps within a range of one to five seconds. The available voltage time ramps are illustrated by the curves shown in FIG. 4 where the center curve represent the preset voltage time ramp. The preset and driver selected maximum set power level and voltage time ramp are stored in the EEPROM 48. Thus, the most recent setting is preserved should the power supply 23 be disconnected from the controller 11. The MPU 44 selects a duty cycle incremental increase that corresponds to both the selected maximum power level and voltage ramp time such that the maximum power level will be reached within the voltage ramp time. In the preferred embodiment, the voltage ramps are linear functions of time, as shown in FIG. 4; however, the invention also may be practiced with voltage ramps that are non-linear functions of time (not shown).

After increasing the power level, the algorithm advances to decision block 117 where the MPU 44 determines whether the maximum power level has been reached. In the embodiment illustrated in FIG. 3, the brake application counter is compared to a final value, that is, the duration of the ramp time is checked. Alternately, the output power could be compared to the maximum set power level to determine whether the final level has been reached. If the ramping up of the power level is not completed, the algorithm transfers back to functional block 108 where the brake apply counter is again indexed. The algorithm then continues to increase the power being supplied to the brake coils 19, as described above.

If, in decision block 117, the MPU determines that the ramping up of the power is completed, the algorithm transfers to decision block 118 where the bake light switch 22 is again checked. If the brake light switch 22 has opened, it is indicative that the driver has released the towing vehicle brakes. Accordingly, the algorithm transfers to functional block 112 where the MPU 44 terminates the brake control signal to release the brakes and the algorithm is exited, as described above. If, in decision block 120, the MPU 44 determines that the brake light switch 22 is still closed, the algorithm transfers to functional block 119 where the output power is maintained at the maximum set power level. The algorithm then returns to decision block 120 where it continues to monitor the condition of the brake light switch 22.

Figure 3:
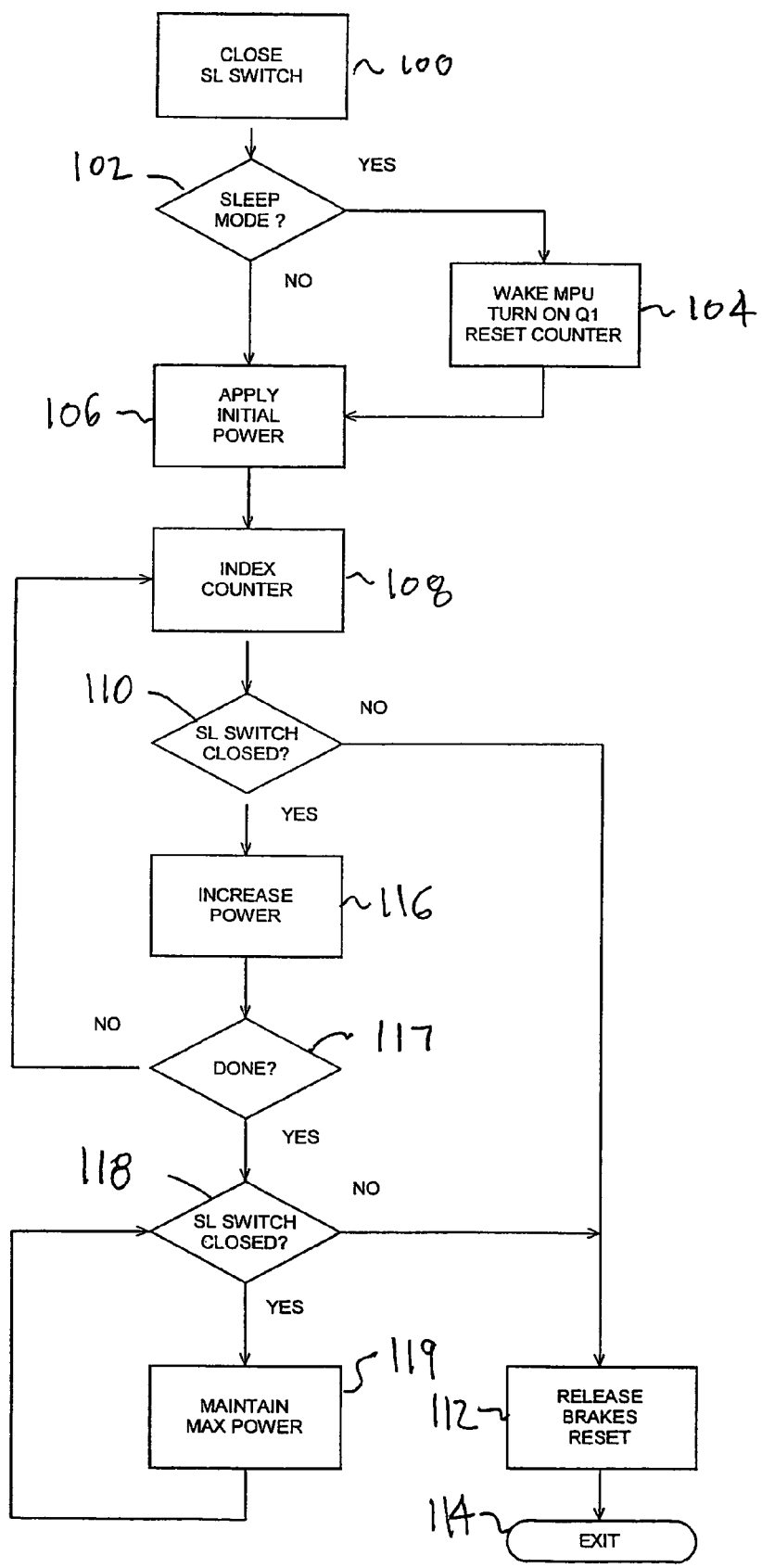
FIG. 3 is a flow chart illustrating the operation of the controller shown in FIG. 1.

It will be appreciated the flow chart shown in FIG. 3 is intended to exemplary and that the operation of the invention also may be practiced other than is shown in the figure. Additionally, while not shown in FIG. 3, a signal received from either of the manual controls 38 or 40 that exceeds the ramp signal will override the ramp signal.

The MPU 44 continuously monitors battery voltage, output voltage and output current. The controller can be set by the towing vehicle driver to display the output Power, output Voltage or output Current upon the digital display 30. The display 30 shows a "P" for power display mode, "C" for current display mode and "E" for voltage display mode. These letters are always displayed while the controller is awake and brake coils 19 are detected by the MPU as being connected to the controller 11.

During normal operation, the driver of the towing vehicle may select an output display mode for the digital display 30. Upon repeated pressing the "+", or plus, pushbutton 34, the display will cycle thorough the letters P, E, and C. The letter will flash when displayed. When the desired mode is displayed, it may be selected by pressing and holding the "−", or minus, pushbutton 32, until the flashing stops. The mode will then be selected, and, upon actuation of the trailer brakes 13 and 14, two digits will be displayed, representing the percentage of the maximum available power for the power mode, and, for the voltage or current modes, the average applied voltage or current, being supplied to the trailer brakes by the controller 11. It is recommended that the output power value be displayed and that the output current value be used only for trouble shooting or setting up the controller 11. The output current value can be used to ensure that the amperage draw of the trailer brakes is in the proper range for the number of axles on the towed vehicle. The output current should not be displayed during operation because the reading may vary significantly due to temperature swings in the brake magnets. The output voltage could be selected for display, however, the actual output voltage may vary from the displayed voltage during a brake application.

An alternate embodiment of the controller also may be used with electro-hydraulic trailer brakes (not shown). Such brakes present a very high impedance to the brake controller, however, the alternate embodiment is designed to function when connected either electro-hydraulic or straight electric trailer brakes. The alternate controller includes three additional modes besides the ones desribed above, namely, PH, EH and CH, corresponding to values of output Power-Hydraulic brakes, output Voltage-Hydraulic brakes and output Current-Hydraulic brakes, respectively.

As indicated above, the invention contemplates adjustment of the both the maximum set power level and the voltage ramp time parameters by driver of the towing vehicle. The adjustment of the parameters is implemented by selective operation of the pushbuttons 32 and 34, while coded signals are provided by the digital display 30. The voltage ramp time may be set between one and five seconds in one second increments while the maximum output power may be set may be set in five percent increments from 10% to 100%.

Figure 5:
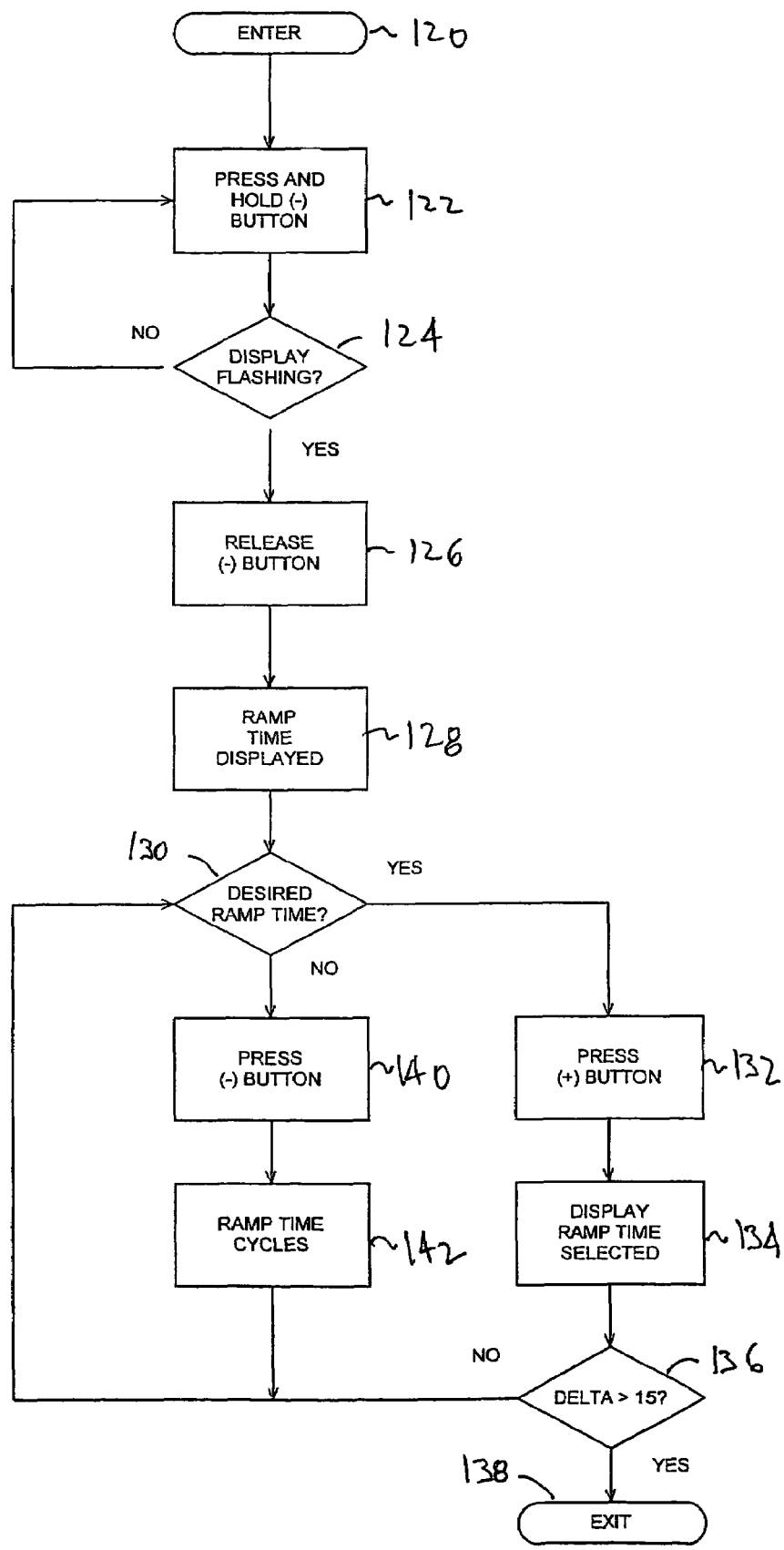
FIG. 5 is flow chart illustrating the selection of the ramp time for the controller shown in FIG. 1.

A flow chart for setting the ramp time is shown in FIG. 5. The flow chart is entered through block 120 and proceeds to functional block 122 where the towing vehicle driver presses and holds the minus pushbutton 32. The flow chart advances to decision block 124 where the driver checks whether the digital display 30 is flashing. If the display is not flashing, the flow chart returns to functional block 122 as the driver continues to depress the minus pushbutton 32. Upon the display flashing, the flow chart advances to functional block 126 where the driver releases the minus pushbutton 32. The display will then display and flash the current ramp time setting, as shown in functional block 128. As described above, a value of three seconds is preset by the manufacturer and stored in the EEPROM 48, as is the last value set by the driver. Accordingly, the last setting placed in the EEPROM 48 will be displayed in functional block 128.

The flow chart advances to decision block 130, where the driver decides whether the displayed ramp time is satisfactory. If the displayed ramp time is satisfactory, the driver depresses and holds the plus pushbutton 34 in functional block 132 until the flashing of the digital display 30 stops. When the flashing stops, the driver releases the plus pushbutton 34, setting the ramp time, and the flow chart advances to functional block 134 where the newly set ramp time is stored in the EEPROM 28 and the value is displayed for 15 seconds, after which the display 30 will revert to the normal display mode. The flow chart then advances to decision block 136 and checks if the plus pushbutton 34 has been pressed within the last 15 seconds to select another value. If the plus pushbutton 34 has not been pressed during the last 15 seconds, the flow chart exits through block 138. However, if the plus pushbutton 34 has been pressed during the last 15 seconds, the flow chart returns to decision block 130.

If, in decision block 130, the desired ramp time is not displayed, the flow chart advances to functional block 140 where the driver presses the minus pushbutton 32 to cycle through the available ramp times. Upon pressing the minus pushbutton 32, the flow chart cycles to the next value for the ramp time, which is displayed upon the digital display 30 and then returns to decision block 130. The driver continues in the cycle loop until the desired ramp time is displayed, at which point, the driver presses the plus pushbutton 34, as described above, to select the displayed ramp time.

Figure 6:
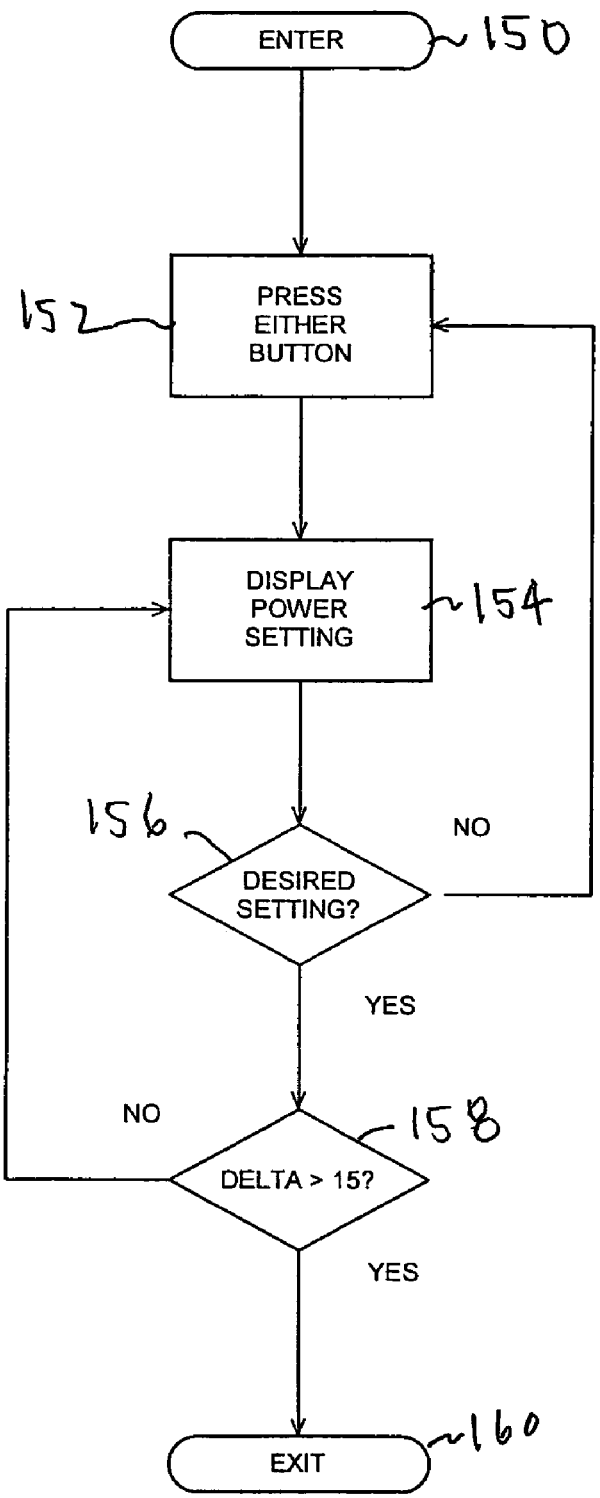
FIG. 6 is a flow chart illustrating the selection of the maximum power output level for the controller shown in FIG. 1.

A flow chart for setting the maximum output power is shown in FIG. 6. The flow chart is entered through block 150 and proceeds to functional block 152 where the driver momentarily depresses either the minus or the plus pushbutton, 32 or 34 to cause the controller to display the current maximum power setting, as shown in functional block 154. The maximum power is the percentage of available power that is sent to the towed vehicle brakes upon completion of the voltage ramp time. The controller 11 is preset at the manufacturer with a maximum power setting of 50%, which is stored in the EEPROM 48.

The flow chart then advances to decision block 156 where the driver decides whether the setting is satisfactory. If the setting is not satisfactory, the driver returns to functional block 152 and driver either presses the plus pushbutton 34 to increase the maximum power setting, or the driver presses the minus pushbutton 32 to decrease the maximum power setting. Each time one of the buttons is depressed, the maximum power setting is incrementally changed by five percent. When the selected pushbutton is pressed, the new value is immediately changed and the new setting is both displayed and stored in the EEPROM 48. If the new value is the desired value, the driver does nothing for 15 seconds. Accordingly, the flow chart advances to decision block 158 where the time period since the last pushbutton input, $\Delta T$, is compared to the time period of 15 seconds. If $\Delta T$ is less than 15 seconds, the flow chart returns to functional block 154 where the current setting is displayed and continues in the loop until either one of the pushbuttons 32 or 34 is again depressed or the time period $\Delta T$ is exceeded. Once $\Delta T$ is greater than 15 seconds, the flow chart exits through block 160.

It will be appreciated the flow charts shown in FIGS. 5 and 6 are intended to exemplary and that the operation of the invention also may be practiced other than is shown in the figures.

The MPU 44 continuously monitors parameters and conducts self-tests of the towed vehicle, the towing vehicle or the controller itself. Upon detecting a fault or problem, the MPU 44 will display a flashing symbol upon the digital display 30. As described above, the MPU 44 also is operative to flash various symbols and numbers upon the digital display 30 that are used to set up and monitor the performance of the towed vehicle brakes 13 and 14. For the preferred embodiment, the various available symbols, with descriptive captions, are illustrated in FIG. 7. The operating mode displays for power, voltage and current, which were described above, are also shown in FIG. 7. Several of the self-tests and the corresponding symbols shown in FIG. 7 are described in the following paragraphs. The other captions shown in FIG. 7 that are not described are considered self-explanatory.

If the current being supplied to the brake coils 19 is above the controller's rating, up to a fixed limit, the MPU 44 will flash "CL" upon the digital display 30 to inform the driver know that the current being generated is higher than the rated value. The controller 11 continues to supply all of the current required by the load but signals the operator of the high current usage even if the controller display is set in power display or voltage display mode.

The MPU 44 flashes "SC" upon the digital display 30 any time it detects a short circuit in the output line 12 connected to the trailer brake coils 19. The MPU 44 tests for short circuits every 5 seconds while awake and continuously during braking cycles. Prior art controllers only check for shorts during actual braking cycles. This improved method will alert the driver that there is a short in the brake coil line before the brakes are applied.

Similarly, the MPU 44 checks for an open circuit in the output line 12 connected to the trailer brake coils 19 every 5 seconds. If an open circuit is detected, a flashing "OC" is displayed upon the digital display 30. This will alert the operator when the trailer connection is detached. This will be useful if the operator forgets to attach the trailer to the towing vehicle or if the trailer is detached without his knowledge.

If the MPU 44 detects that the hazard flashers are on, "HF" is flashed upon the display 30 and the MPU 44 does not turn on the output. This makes the controller immune to hazard flasher operation and alerts the operator that the hazard flashers are on.

If the MPU 44 detects a voltage on the blue output wire when the output is off, it flashes "bF" upon the display 30 for blue wire fault. This is a frequent problem during installation when the blue wire is inadvertently connected to a voltage source or a strand in the connector has connected a voltage to the blue wire. It is noted that the blue wire referred to in the "Blue Fault" code is the controller output line 12 connected to the towed vehicle brakes 13 and 14.

The MPU 44 also displays 8.8. upon the display 30 for a few seconds when the controller 11 is first powered up to demonstrate that all of the display elements are working.

Figure 8:
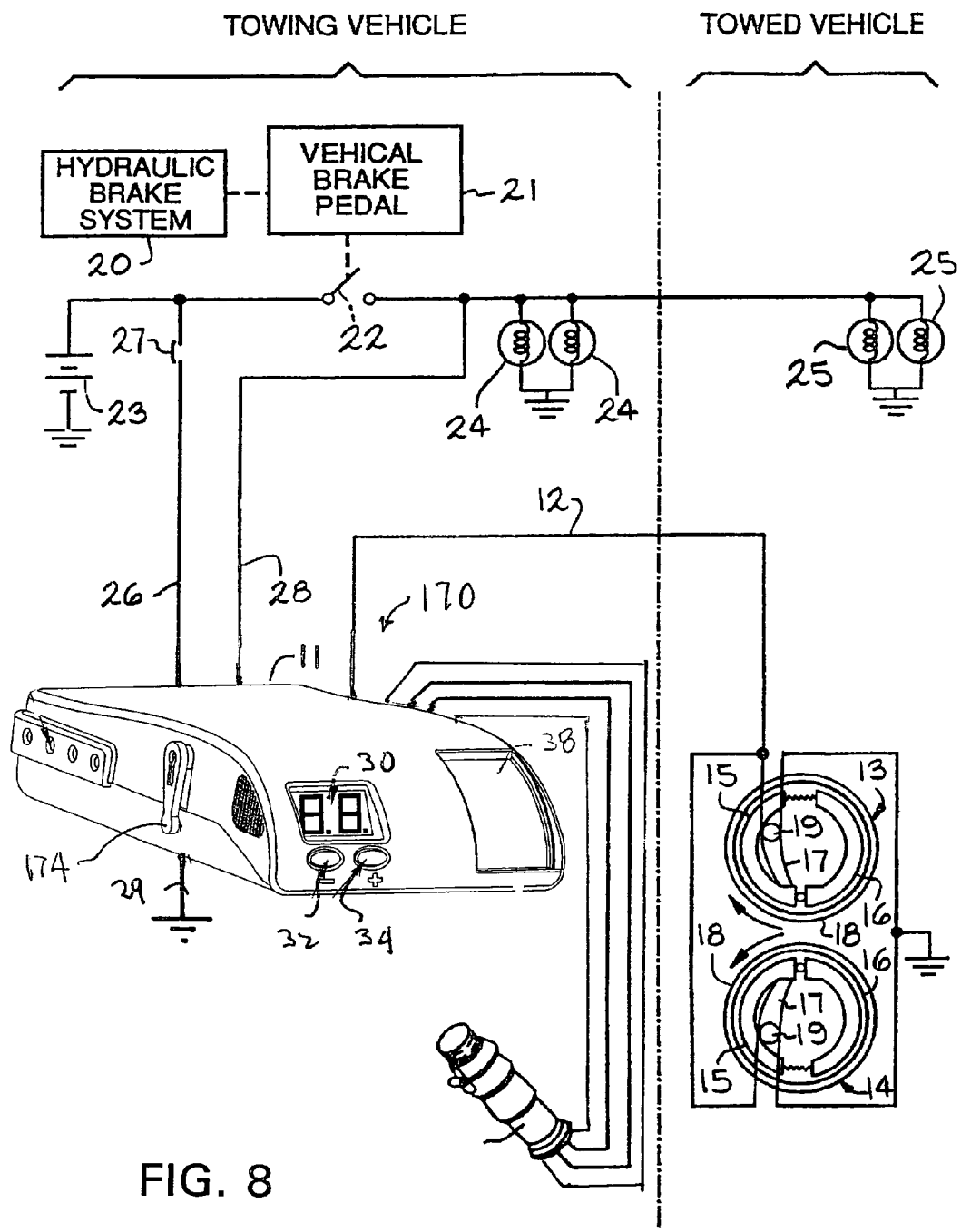
FIG. 8 is a schematic circuit drawing of an alternate embodiment of the brake controller shown in FIG. 1.

The present invention also contemplates an alternate embodiment as an electronic controller 170, as shown in FIG. 8, that includes an internal sensor that senses the deceleration of the towing vehicle and generates a brake signal that is proportional to the deceleration. The controller 170 then generates an electric current that is proportional to the brake signal and is supplied to the trailer brake coils 19. Components in FIG. 8 that are similar to components shown in FIG. 1 have the same numerical designators.

Figure 9:
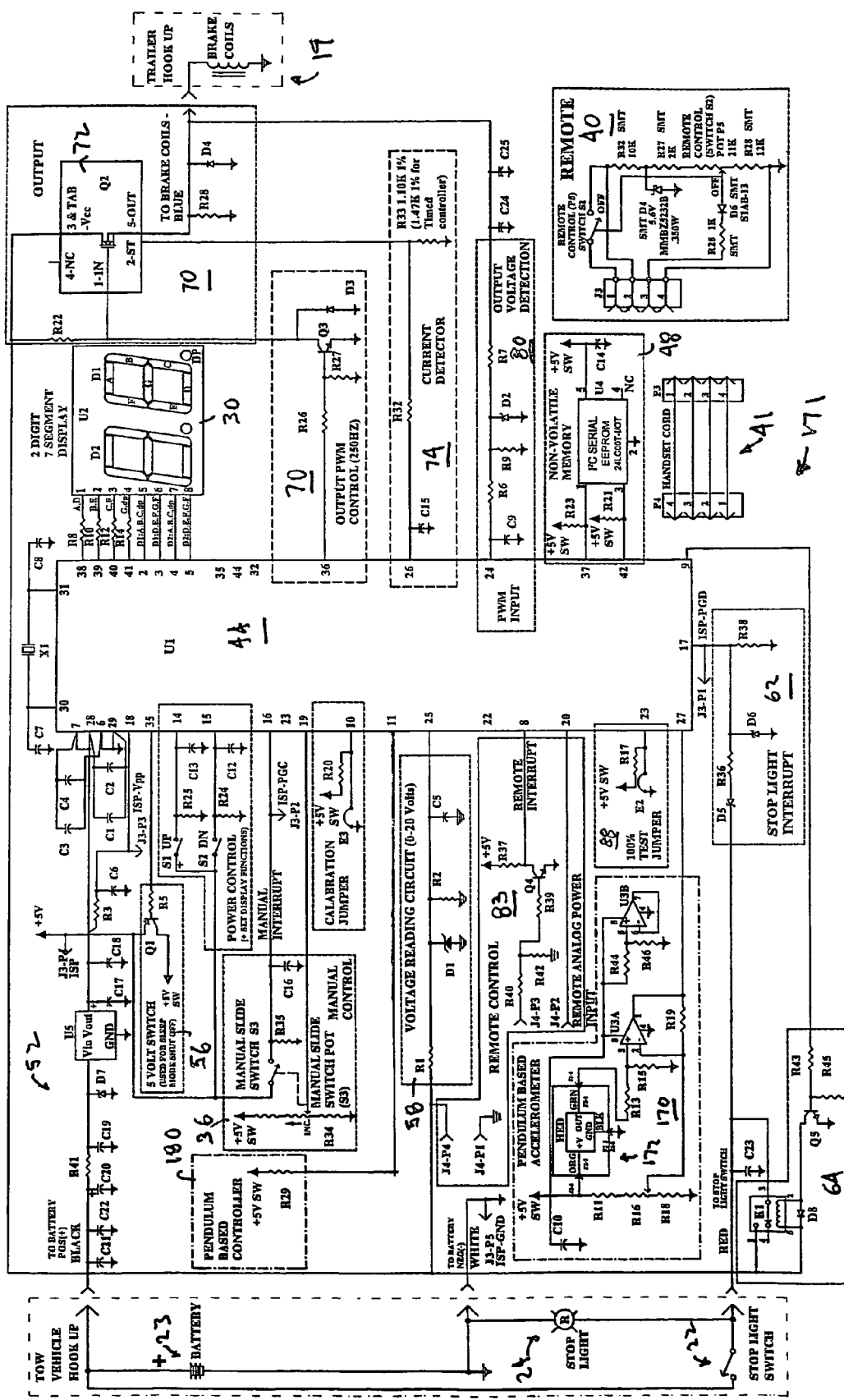
FIG. 9 is a circuit diagram for the brake controller shown in FIG. 8.

A circuit diagram of the electronic controller 170 is shown generally at 171 in FIG. 9, where components that are similar to components shown in FIG. 2 have the same numerical designators. In the preferred embodiment, the electronic controller 170 includes a Hall effect pendulum device 172 as described in U.S. Pat. No. 6,367,588, which is incorporated herein by reference. While a Hall effect device is illustrated and described, it will be appreciated that the invention also may be practiced with other deceleration sensing devices. The pendulum includes an external lever 174 that is used to adjust the sensitivity of the device 170. Pushing the pendulum lever 174 toward the front of the towing vehicle will provide a momentary delay to the application of the towed vehicle brakes while pulling the lever 174 toward the rear of the towing vehicle will provide more aggressive braking. The controller 170 may be installed below the dashboard of the towing vehicle at an angle within a range of −35° to +90° with the horizontal. The pendulum device 172 includes a potentiometer 174 that is used to calibrate the device for the controller mounting angle. The pendulum device generates a brake signal that is applied to a brake signal input pin 178 of the MPU 44. The MPU 44 is responsive to the brake input signal to generate a PWM signal at the brake control output port 66 having a duty cycle that is proportional to the magnitude of the brake input signal.

The controller circuit 171 also includes an input selection circuit 180 that comprises the interruptible standby voltage SV5V connected through a resistor R29 to the operational mode port 61 of the MPU 44. The resulting high voltage at the operational mode port 61 signals the MPU 44 to select the coding stored in its internal ROM memory that corresponds to the brake signal generated by the pendulum device 172. The controller 170 also includes two calibration circuits 88 and 90. The first calibration circuit 88 functions as described above for the time based controller 11. The second calibration circuit 90 is utilized to calibrate the pendulum device 172. With the controller 170 in a horizontal position and the second jumper E3 inserted, the external lever 174 is moved first to vertical position and the internal potentiometer 176 adjusted such that a zero brake signal is produced, which is equivalent to 0 g deceleration. The external lever 174 is then moved to a position forming a 30° angle with the horizontal and the internal potentiometer 176 adjusted such that a brake signal is produced which is equivalent to 0.5 g deceleration. Both a manual brake slide lever 38 and a remote manual brake control 40 are also included in the controller 170, as shown in FIG. 9; however, as with the controller 11 shown in FIG. 2, the remote manual control 40 is optional. If the remote manual control 40 is omitted, the circuit wake up pin 84 is left floating while the brake signal input pin is held high by being connected through a resistor R37 to the regulated voltage supply (not shown). The manual slide lever 38 is calibrated as described above. As before, upon exceeding the brake signal generated by the pendulum device 172, both manual brake controls 38 and 40 override the pendulum device brake control signal. The remaining portions of the controller circuit 171 are the same and function as the same described above for the time based controller 11.

Figure 10:
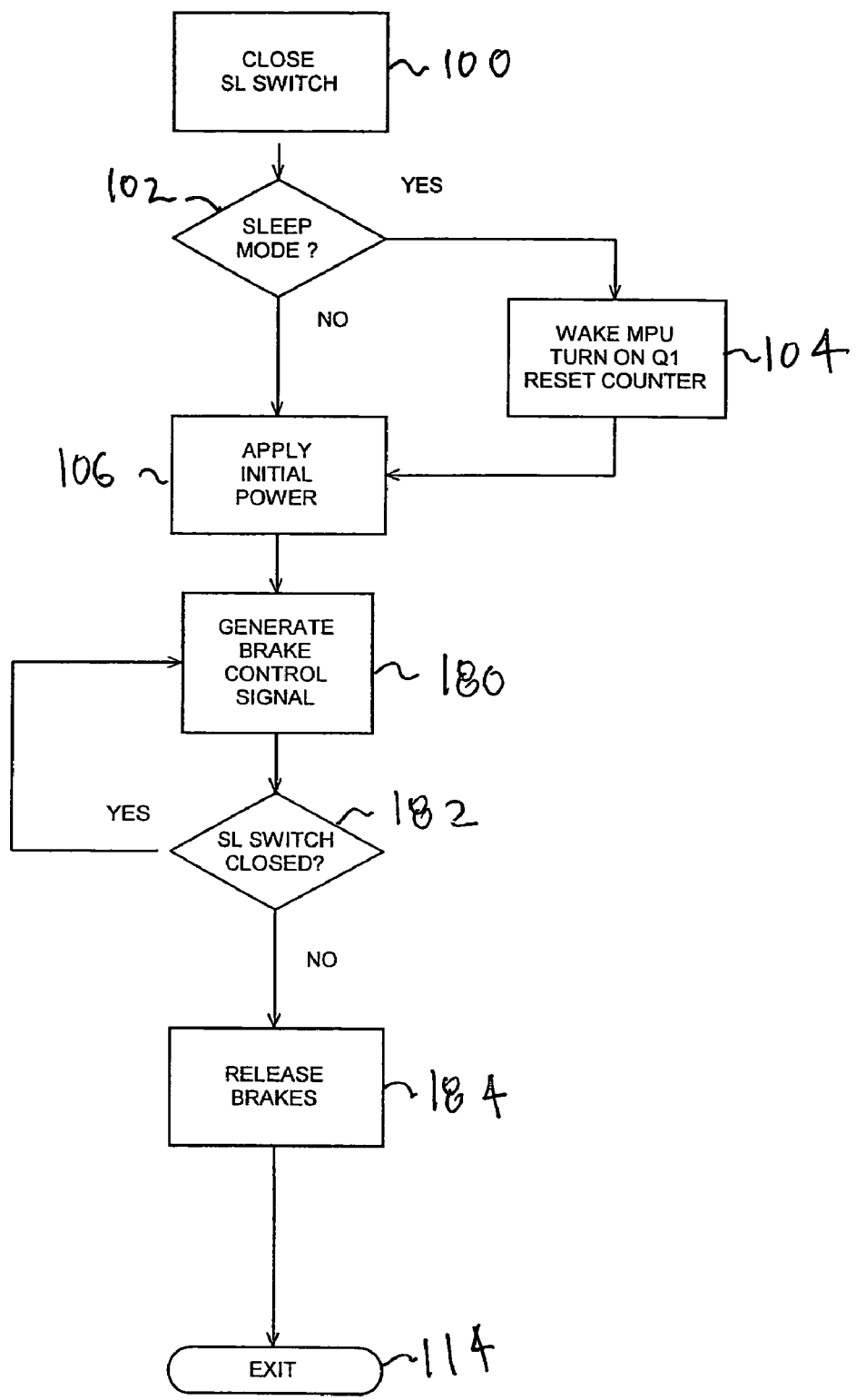
FIG. 10 is a flow chart illustrating the operation of the controller shown in FIG. 8.

The operation of the electronic controller 170 will now be described. The controller 170 follows an operating algorithm that is stored in the MPU 44 and illustrated by the flow chart shown in FIG. 10 where steps that are similar to steps shown in FIG. 3 have the same numerical designators. Control is initiated upon closure of the stop light switch. Closure of the stop light switch 22 applies a voltage to the stop light interrupt circuit 62 which in turn takes the stop cycle input port 63 of the MPU 44 high. In response to the input port 63 going high, the MPU determines whether the controller 11 is in the sleep mode in decision block 102. If the controller 11 is in the sleep mode, the algorithm transfers to functional block 104 where the MPU 44 is turned fully on. Also, the sleep mode switch Q1 is placed in a conducting state to supply power SV5V to the selected circuit components. Additionally, a sleep counter is reset for eventual return to the sleep mode. The algorithm then advances to functional block 106. If, in decision block 102, the controller 11 is not in the sleep mode, the algorithm transfers directly to functional block 106.

In functional block 106 the MPU 44 begins generating a PWM brake control signal with a preset initial duty cycle.

The brake control signal is applied to the output power circuit 70 where the power switch 72 is cycled between its conducting and non-conducting states to supply a PWM output current to the trailer brake coils 19. In the preferred embodiment, the frequency of the output current is 250 Hz; however, the invention also can be practiced with other output current frequencies. Also in the preferred embodiment, the initial PWM duty cycle is preset by the manufacturer such that the initial current supplied to the brake coils 19 will provide an average of 10% of the maximum power available from the controller 11. However, as will be described below, the initial power level may be reset by the driver of the towing vehicle.

After the initial current is applied to the brake coils 19, the algorithm advances to functional block 180 where the MPU 44 continues to generate an output brake control signal having a duty cycle that is directly proportional to the magnitude of the brake signal received from the pendulum device 172. Thus, the braking force supplied by the towing vehicle brakes will be directly proportional to the magnitude of the sensed deceleration of the towing vehicle. The MPU 44 does limit the brake control signal to a maximum duty cycle that corresponds to a maximum power output to the towed vehicle brakes. The maximum duty cycle is preset by the manufacturer such that the initial current supplied to the brake coils 19 will provide an average of 50% of the maximum power available from the controller 11. However, as will be described below, the maximum power may be reset by the driver of the towing vehicle. Because the duty cycle of the brake control signal is proportional to the output signal received from the pendulum device 172, the invention contemplates that the initial power level also is the minimum power level produced by the controller 170.

The algorithm continues to decision block 182 where the condition of the bake light switch 22 is checked. If the brake light switch 22 has opened, it is indicative that the driver has released the towing vehicle brakes. Accordingly, the algorithm transfers to functional block 184 where the MPU 44 terminates the brake control signal to release the towed vehicle brakes. The algorithm is then exited through block 114. If, in decision block 182, the MPU 44 determines that the brake light switch 22 is still closed, the algorithm transfers back to functional block 180 where the MPU 44 continues to generate a PWM brake control having a duty cycle that is proportional to the strength of the brake signal received from the pendulum device 172. The algorithm then returns to decision block 182 where it again monitors the condition of the brake light switch 22.

Similar to the time based controller 11 described above, the driver of the towing vehicle may select an output display mode for the digital display 30 of the controller 170. Upon repeated pressing the plus pushbutton 34, the display will cycle thorough the letters P, E, and C, for values of output Power, output Voltage and output Current, respectively. The letter will flash when displayed. When the desired mode is displayed, it may be selected by pressing and holding the minus pushbutton 32, until the flashing stops. The mode will then be selected, and, upon actuation of the trailer brakes 13 and 14, two digits will be displayed, representing the percentage of the maximum available power for the power mode, and, for the voltage or current modes, the average applied voltage or current, being supplied to the trailer brakes by the controller 11. It is again recommended that the output voltage power be displayed and that the output current value be used only for trouble shooting or setting up the controller 11. The output current value can be used to ensure that the amperage draw of the trailer brakes is in the proper range for the number of axles on the towed vehicle The output current should not be displayed during operation because the reading may vary significantly due to temperature swings in the brake magnets.

Again, an alternate embodiment of the controller 170 also may be used with electro-hydraulic trailer brakes (not shown). Such brakes present a very high impedance to the brake controller, however, the alternate embodiment is designed to function when connected either electro-hydraulic or straight electric trailer brakes. The alternate controller includes three additional modes besides the ones desribed above, namely, PH, EH and CH, corresponding to values of output Power-Hydraulic brakes, output Voltage-Hydraulic brakes and output Current-Hydraulic brakes, respectively.

As described above, the initial output power level is preset at 10%. However, the controller 170 includes the capability to reset the initial power level in 5% increments up to a maximum of 25%. This allows the towing vehicle operator to select a minimum turn on power level that corresponds to different load ratios between the towing vehicle weight and the load weight. For example, if the load is a lot heavier than the towing vehicle, the minimum turn on can be set to 25% while a light utility trailer should use 10% minimum turn on. While the initial output power range may be set within 10% to 25% in the preferred embodiment, it will be appreciated that the invention also may be practiced with other minimum output power setting ranges, such as for example, 5% to 30%.

Figure 11:
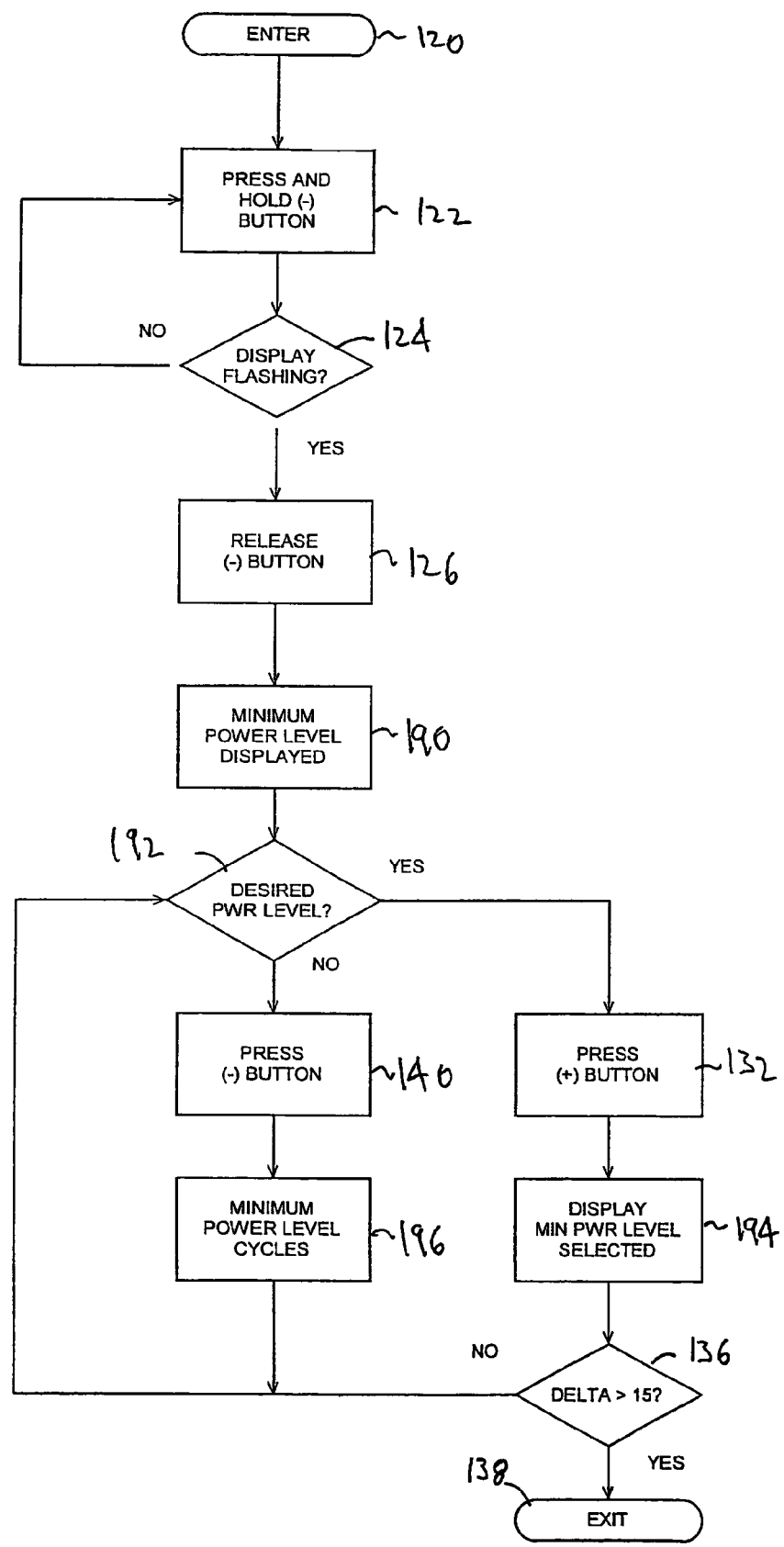
FIG. 11 is flow chart illustrating the selection of the initial power output level for the controller shown in FIG. 8.

A flow chart for setting the initial output power level is illustrated in FIG. 11 where blocks that are similar to blocks shown in FIG. 5 have the same numerical designators. The flow chart is entered through block 120 and proceeds to functional block 122 where the towing vehicle driver presses and holds the minus pushbutton 32. The flow chart advances to decision block 124 where the driver checks whether the display is flashing. If the display is not flashing, the flow chart returns to functional block 122 as the driver continues to depress the minus pushbutton 32. Upon the display flashing, the flow chart advances to functional block 126 where the driver releases the minus pushbutton 32. The display will then display and flash the current initial power time setting, as shown in functional block 190. As described above, either a value of 10% as preset by the manufacturer and stored in the EEPROM 48, or the last value set by the driver is stored in the EEPROM. Accordingly, the last setting placed in the EEPROM 48 will be displayed in functional block 190.

The flow chart advances to decision block 192, where the driver decides whether the displayed initial power time setting is satisfactory. If the initial power time setting is satisfactory, the driver depresses and holds the plus pushbutton 34 in functional block 132 until the flashing of the display stops. When the flashing stops, the driver releases the plus pushbutton 34, setting the initial power time setting, and the flow chart advances to functional block 194 where the newly set initial power setting is stored in the EEPROM 28 and the value is displayed for 15 seconds, after which the display 30 will revert to the normal display mode. The flow chart then advances to decision block 136 and checks if the plus pushbutton 34 has been pressed within the last 15 seconds to select another value. If the plus pushbutton 34 has not been pressed during the last 15 seconds, the flow chart exits through block 138. However, if the plus pushbutton 34 has been pressed during the last 15 seconds, the flow chart returns to decision block 192.

If, in decision block 192, the desired initial power setting is not displayed, the flow chart advances to functional block 140 where the driver presses the minus pushbutton 32 to cycle through the available ramp times. Upon pressing the minus pushbutton 32, the flow chart cycles to the next value for the initial power time setting, which is displayed upon the digital display 30, and then returns to decision block 192. The driver continues in the cycle loop until the desired initial power setting is displayed, at which point, the driver presses the plus pushbutton 34, as described above, to select the displayed initial power setting.

Figure 12:
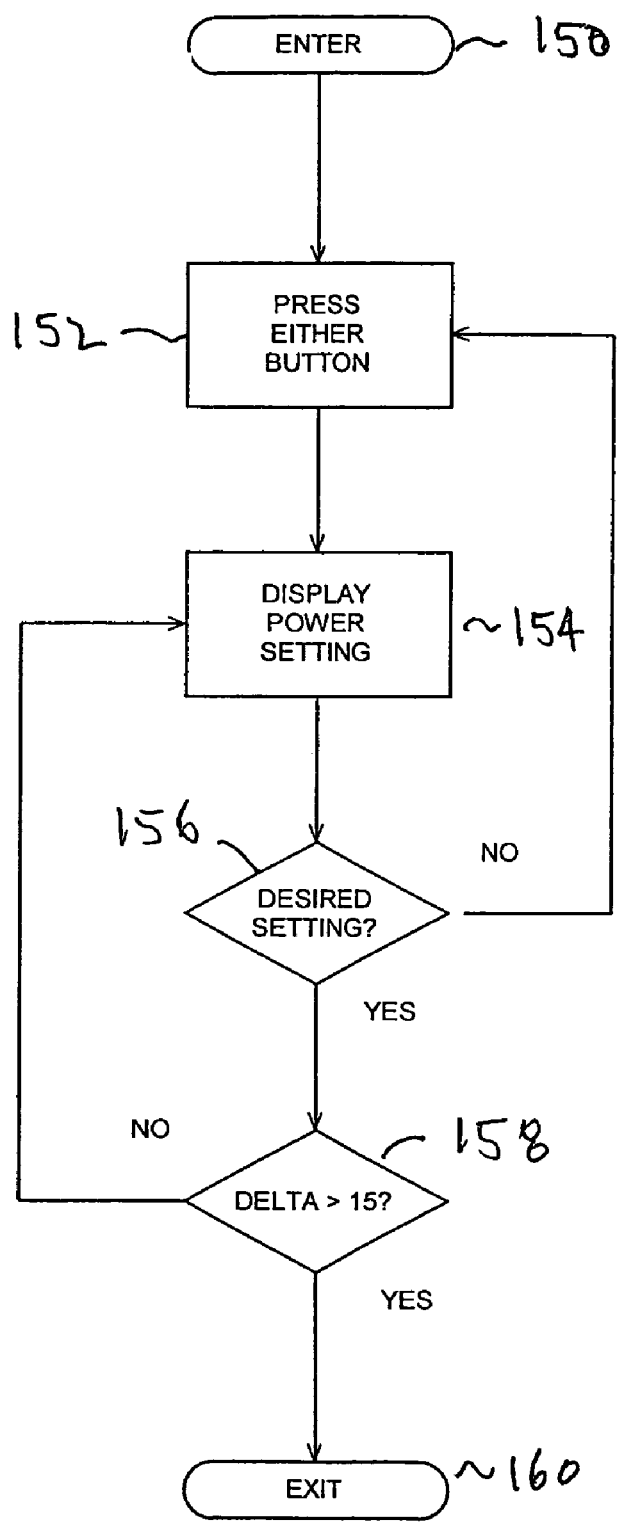
FIG. 12 is a flow chart illustrating the selection of the maximum power output level for the controller shown in FIG. 8.

As also described above, the maximum output power level is preset at 50%. However, the controller 170 includes the capability to reset the maximum power level in 5% increments up to a maximum of 100%, which is shown as "99" on the digital display 30, or down to the current minimum power level setting. A flow chart for setting the maximum power level is illustrated in FIG. 12 where blocks that are similar to blocks shown in FIG. 6 have the same numerical designators. The flow chart is entered through block 150 and proceeds to functional block 152 where the driver momentarily depresses either the minus or the plus pushbutton, 32 or 34 to cause the controller to display the current maximum power setting, as shown in functional block 154. The maximum power is the percentage of available power that is sent to the towed vehicle brakes upon completion of the voltage ramp time. The controller 11 is preset at the manufacturer with a maximum power setting of 50%, which is stored in the EEPROM 48.

The flow chart then advances to decision block 156 where the driver decides whether the maximum setting is satisfactory. If the setting is not satisfactory, the driver returns to functional block 152 and driver either presses the plus pushbutton 34 to increase the maximum power setting, or the driver presses the minus pushbutton 32 to decrease the maximum power setting. Each time one of the buttons is depressed, the maximum power setting is incrementally changed by five percent. When the selected pushbutton is pressed, the new value is immediately changed and the new setting is both displayed and stored in the EEPROM 48. If the new value is the desired value, the driver does nothing for 15 seconds. Accordingly, the flow chart advances to decision block 158 where the time period since the last pushbutton input, $\Delta T$, is compared to the time period of 15 seconds. If $\Delta T$ is less than 15 seconds, the flow chart returns to functional block 154 where the current setting is displayed and continues in the loop until either one of the pushbuttons 32 or 34 is again depressed or the time period $\Delta T$ is exceeded. Once $\Delta T$ is greater than 15 seconds, the flow chart exits through block 160. As also described above, the maximum power level setting can not be reduced below the current initial, or minimum, power level setting.

It will be appreciated the flow charts shown in FIGS. 11 and 12 are intended to exemplary and that the operation of the invention also may be practiced other than is shown in the figures.

The digital display 30 also is operative, under control of the MPU 44, to flash various symbols and numbers that are used to set up and monitor the performance of the towed vehicle brakes 13 and 14. The MPU 44 continuously monitors parameters and will display a flashing symbol upon detection of a problem with the towed vehicle, the towing vehicle or the controller itself. For the preferred embodiment, the various available symbols for the controller 170, with descriptive captions, are illustrated in FIG. 7 and described above.

Figure 13:
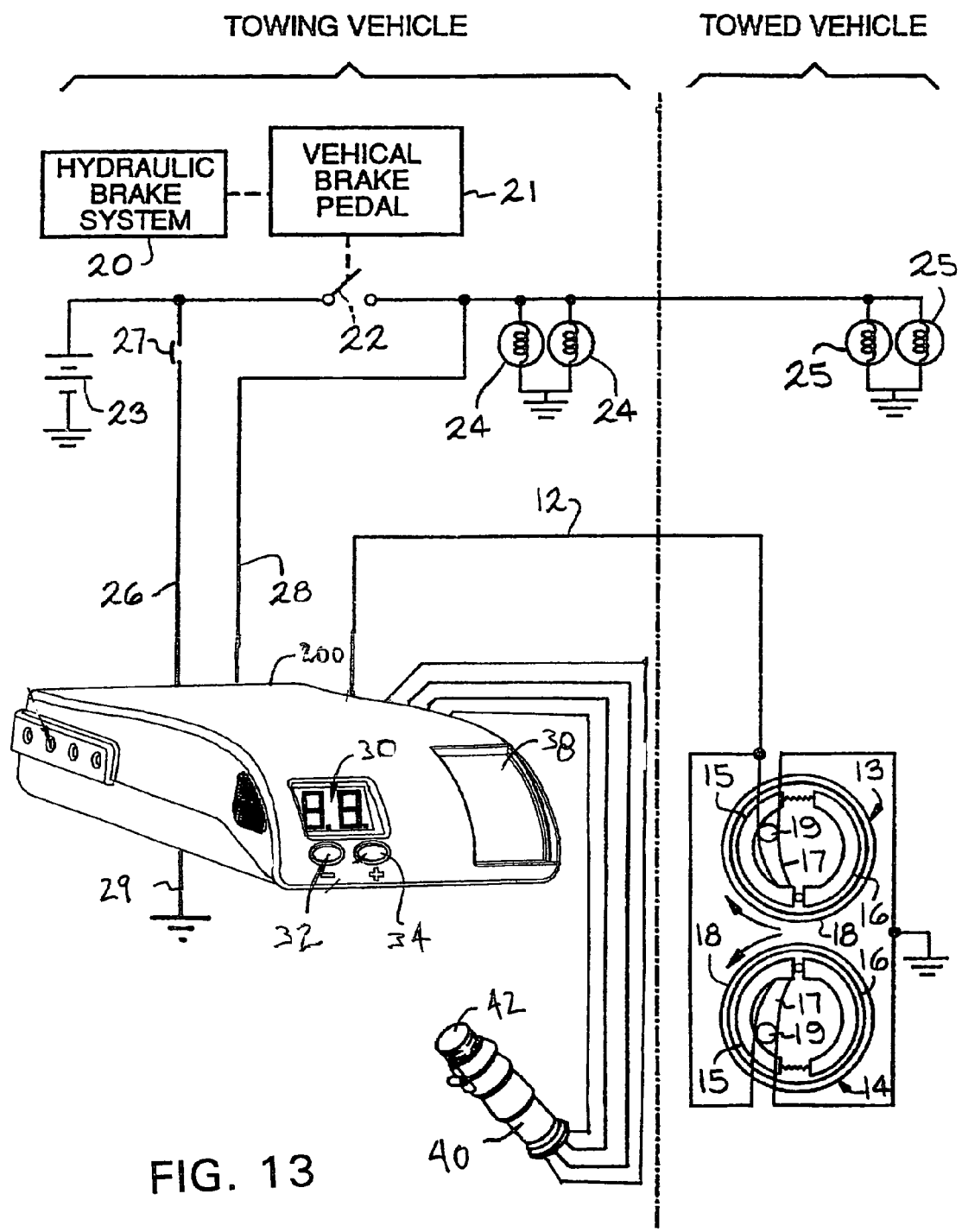
FIG. 13 is a schematic circuit drawing of another alternate embodiment of the brake controller shown in FIG. 1.
Figure 14:
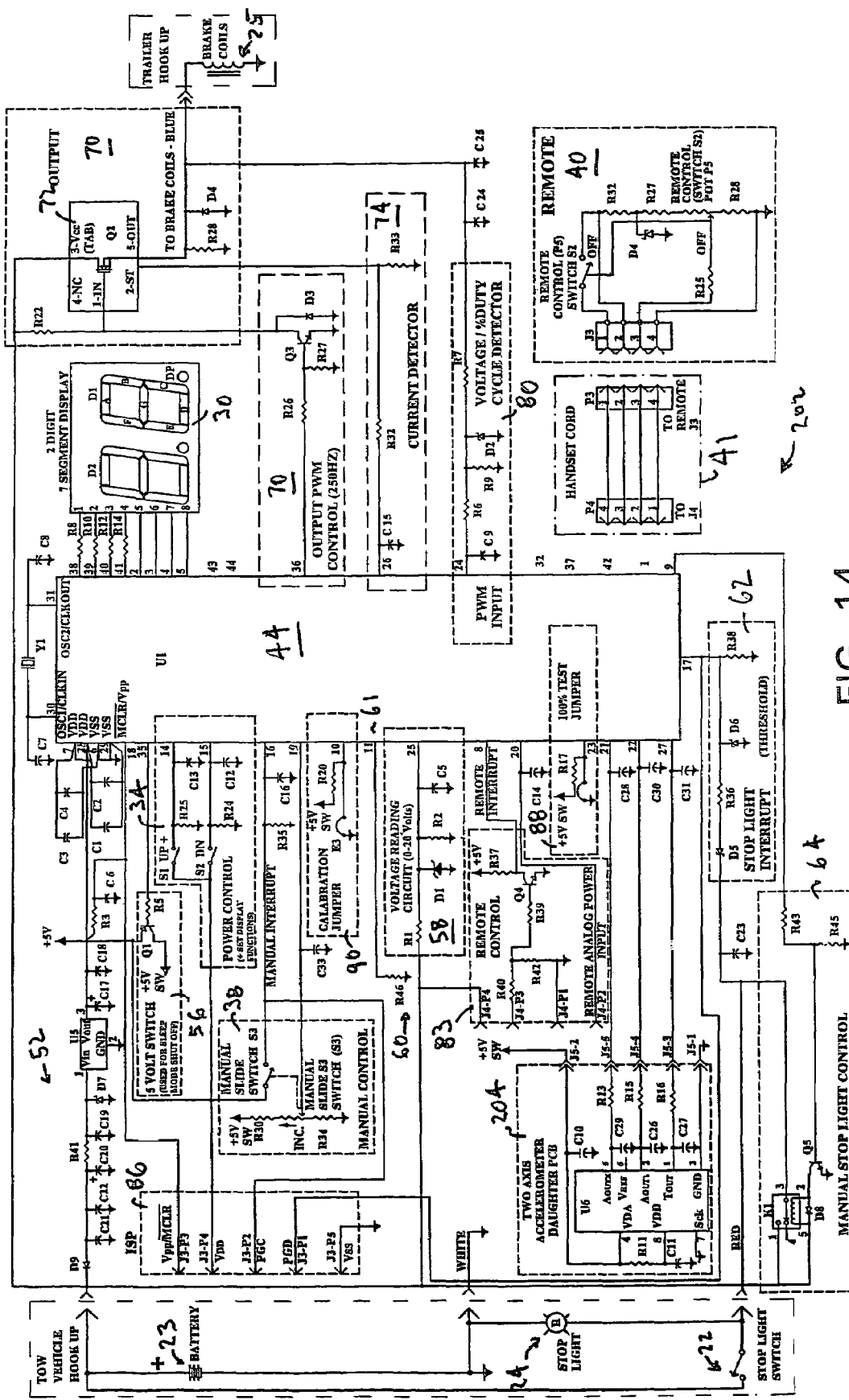
FIG. 14 is a circuit diagram for the brake controller shown in FIG. 13 that includes a two axis accelerometer.

The present invention also contemplates another alternate embodiment as an electronic controller 200, as shown in FIG. 13, where components that are similar to components shown in FIG. 8 have the same numerical identifiers. The electrical circuit for the controller 200 is illustrated by the schematic circuit diagram 202 shown in FIG. 14, where components that are similar to components shown in FIG. 9 have the same numerical identifiers. For clarity, only one towing vehicle stop light 24 is shown in FIG. 13. The controller circuit 202 includes a two-axis accelerometer 204 that senses the deceleration of the towing vehicle along two orthogonal axes. A first deceleration signal, which is identified as $A_{OUTX}$, is taken along a first accelerometer axis and supplied via the line labeled J5-5 to the microprocessor unit 44. A second deceleration signal, which is identified as $A_{OUTY}$, is taken along a second accelerometer axis that is perpendicular to the first axis and is supplied via the line labeled J5-4 to the microprocessor unit 44. As will be described below, the microprocessor unit is responsive to the received deceleration signals to generate a brake control signal that is proportional to the deceleration of the towing vehicle. The controller 200 then generates an electric current that is proportional to the brake signal and is supplied to the trailer brake coils 19, similar to the controller 170 illustrated and described above. Additionally, as shown in FIG. 14, the accelerometer 204 also includes a temperature sensor which generates a temperature signal, $T_{OUT}$. The temperature signal is supplied via the line labeled J5-3 to a corresponding input port on the microprocessor 44. Similar to the circuit shown in FIG. 2, the microprocessor unit port labeled 61 is connected through resistor R46 to ground. In the preferred embodiment, the MPU 44 includes both a ROM and an EEPROM that permanently stores coding for the controller operating algorithm and an that stores operational settings for the controller 11 as provided by the manufacturer or input by the driver by means of the pushbuttons 32 and 34. However, the invention also may be practiced with an external EEPROM (not shown) similar to the memories 48 shown in the controller circuits 36 and 171 illustrated in FIGS. 2 and 9, respectively.

The two axis accelerometer 204 allows for increased mounting angles upon the towing vehicle while also providing increased accuracy for sensing deceleration at extreme mounting angles. In the preferred embodiment, a Memsic MAX2500EL is used for the two axis accelerometer; however, the invention also may be practiced using other two axis accelerometers, such as, for example, an Analog Devices ADXL202E. A first sensor device within the accelerometer 204 is positioned to measure deceleration along an axis which is perpendicular to the sensing axis of a second sensing device. Thus, the first and second sensing axes of the sensor devices define a sensing plane. The controller 200 is typically installed with the sensing plane in a vertical orientation and with one of the sensor axes generally parallel a longitudinal axis of the towing the vehicle such that the sensing plane is aligned with the direction of travel of the towing vehicle. Ideally, the controller 200 would be mounted within a towing vehicle with the first sensing device generally aligned with a horizontal longitudinal axis of the towing vehicle while the second sensing device is generally aligned with a vertical axis of the towing vehicle (not shown). However, the controller 200 is usually positioned beneath the towing vehicle dashboard at an angle relative to the horizontal to provide easy access by the towing vehicle operator during use. Additionally, when the towing vehicle encounters an incline, the controller is further displaced from the horizontal and vertical directions. Accordingly, as described below, the microprocessor unit 44 within the controller 200 is programmed to compensate for mounting angles and operation upon inclines. The sensing devices generate first and second deceleration signals that are proportional the deceleration of the towing vehicle along the corresponding senor axes. The generated deceleration signals are sent to the MPU 44. The towing vehicle deceleration is then calculated by the MPU 44 from the first and second deceleration readings with an algorithm stored within the MPU.

In the preferred embodiment, the instantaneous deceleration of the towing vehicle is calculated by the algorithm from the following formula:

Deceleration=1 g times $\arctan(A_{OUTY}/A_{OUTX})$, where g=the force of gravity, $A_{OUTY}$ is the output of the second sensor device along a vertical axis of the towing vehicle, $A_{OUTX}$ is the output of the first sensor device along the horizontal longitudinal axis of the towing vehicle, and $\arctan(A_{OUTY}/A_{OUTX})$ is the angle between the controller and a horizontal plane in radian degrees.

Thus, the above relationship automatically compensates for any inclination of the road and would be applicable if the controller 200 were mounted in a horizontal position within the towing vehicle. However, as described above, the controller 200 is usually mounted at angle to the horizontal. Accordingly, in the preferred embodiment, the MPU 44 includes a mounting angle correction, as shown in the following formula:

Deceleration=1 g times$\{\arctan(A_{OUTY}/A_{OUTX})-\arctan(A_{OTY0}/A_{OUTX0})\}$, where g=the force of gravity, $A_{OUTY}$ is the output of the second sensor device, $A_{OUTX}$ is the output of the first sensor device, $\arctan(A_{OUTY}/A_{OUTX})$ is the angle between the controller and a horizontal plane in radian degrees.

$A_{OUTY0}$ is the "zero" output of the second sensor device, $A_{OUTX0}$ is the "zero" output of the first sensor device, and $\arctan(A_{OUTY0}/A_{OUTX0})$ is the mounting angle between the controller and a horizontal plane in radian degrees.

In the above formula, the second arctangent term compensates the instantaneous reading for the tilt from horizontal due to the controller mounting angle when the controller is mounted with the sensing plane in a vertical orientation. In the preferred embodiment, the compensation angle is determined by calibrating the controller 200 following initial installation in the towing vehicle.

The present invention provides two methods for calibration, or learning the mounting angle or level position. For one method, calibration is manually initiated by depressing both controller buttons 32 and 34 for a predetermined time. This action signals the MPU 44 to obtain the current first and second sensor device readings, which are a function of the force of gravity and the controller mounting angle, and to calculate the second compensating term. The compensating term is then stored in the MPU memory and used to compensate the instantaneous reading that is determined when the brake light switch 22 is closed.

Alternately, the MPU 44 can automatically calibrate the controller 200. For automatic calibration, the MPU 44 stores the sensor readings the first time the brakes are applied as the "zero output" value. The MPU 44 then continuously monitors the outputs of the sensor devices and calculates a series of arctangent values. The values are then combined with the "zero output" values from the initial brake application to calculate a rolling weighted average for the arctangent that is stored and continuously updated in the MPU memory. In the preferred embodiment of the alternate compensation method, 200 values are used to compute the rolling weighted average; however, more or less values could also be utilized. The calculation of the rolling weighted average assigns more weight to the average number than the new value. In the preferred embodiment, the old value has a weight of 19,999 while the new value has a weight of one; however, other weights may be used. In the preferred embodiment, the weighting is essentially equivalent to a DSP low pass filter with the weight coefficients empirically determined as a function of the sampling rate. The rolling average value of the arctangent is then used to compensate the instantaneous reading determined when the brake light switch 22 is closed.

The two calibration methods described above are mutually exclusive. That is, if the towing vehicle operator manually calibrates the controller 200 by depressing the pushbuttons 32 and 34, the MPU 44 will exclude the rolling average calculation. On the other hand, if the operator does not manually calibrate the controller 200, the MPU 44 will implement the rolling average calibration. Furthermore, if the controller 200 is disconnected from the towing vehicle battery 23, recalibration is required, since the disconnection may be due to the controller being removed and being mounted in a different towing vehicle with a different mounting angle. In such a case, the automatic calibration routine assures calibration of the controller 200 should the operator forget, or be unaware of, the need to calibrate the device.

Alternately, the sensor may be mounted with the sensing plane in a horizontal orientation and with one of the sensor axes generally parallel to the longitudinal axis of the towing vehicle. For a horizontal controller orientation, the above formulas are not used. Instead, the accelerometer 204 is mounted upon a daughter board that is attached at an angle to the main circuit board in the controller 200. Additionally, a specific mounting angle beneath the dash is provided for the particular vehicle into which the controller 200 is to be installed. The mounting and angle and the daughterboard angle co-operate to place the accelerometer 204 axes in a horizontal plane. Additionally, the invention contemplates mounting the daughterboard with a first angle relative to the printed circuit board and a second angle relative to an edge of the printed circuit board to provide two degrees or mounting freedom within the controller housing. These two degrees of freedom combine with the specified controller mounting angle to provide three degrees of freedom for mounting the accelerometer relative to the towing vehicle axes. By careful selection of the angles, it is possible to mount the accelerometer 204 with the sensing axes in a horizontal plane and one of the sensing axes parallel to the longitudinal axis of the towing vehicle. Thus, mounting error of an offset angle from the towing vehicle longitudinal axis is avoided. For such a horizontal mounting orientation, the equations given above become:

Deceleration=1 g times $\arctan(A_{OUTZ}/A_{OUTX})$, where g=the force of gravity, $A_{OUTY}$ is the output of the second sensor device along a transverse axis of the towing vehicle, $A_{OUTX}$ is the output of the first sensor device along the horizontal longitudinal axis of the towing vehicle, and $\arctan(A_{OUTZ}/A_{OUTX})$ is the angle between the accelerometer daughter board and a horizontal plane in radian degrees.

The above relationship automatically compensates for any inclination of the road.

From the above description, it is apparent that the two axis acceleration sensor provides an enhancement over the pendulum device shown in the brake controller circuit of FIG. 9. The advantage is that the accelerometer allows the controller to be mounted on the dashboard at any angle, without the mechanical constraints of the pendulum assembly. The pendulum calibration with an external lever 174 is replaced by either the initial electronic adjustment or the use of a rolling average correction factor, as described above.

While the above formulas are applicable for any controller mounting angle, the invention also contemplates simplified versions of the formulas that may be used when the mounting angle is less than 45 degrees from the horizontal. When the mounting angle is less than 45 degrees, the aretangent may be approximated by the ratio of the sensor device output, in which case the instantaneous deceleration formula becomes simply:

$$\text{Deceleration} = 1 \text{ g times } (A_{OUTY}/A_{OUTX}),$$

and the compensated formula becomes simply:

$$\text{Deceleration} = 1 \text{ g times } \{(A_{OUTY}/A_{OUTX}) - (A_{OUTY0}/A_{OUTX0})\}.$$

The above formula would be applicable when a less powerful MPU is utilized. For a horizontal mounting orientation, the deceleration formula becomes:

$$\text{Deceleration} = 1 \text{ g times} (A_{OUTZ}/A_{OUTX}),$$

The present invention also contemplates using a vector sum of the sensor device outputs, as described by the following formula:

$$\text{Deceleration} = [[\{]]\sqrt{(A_{OUTX}^2 + A_{OUTY}^2)}] + 1 \text{ g times } \sin\{\arctan(A_{OUTY}/A_{OUTX}) - \arctan(A_{OUTY0}/A_{OUTX0})\},$$

where the formula terms are as described above and sin represents the sine of the angle determined within the brackets.

The first term in the above formula is vehicle deceleration calculated as the vector sum mounting angle is less than 45 degrees from the horizontal. For such a case, the above formula becomes simply:

$$\text{Deceleration} = [[\{]]\sqrt{(A_{OUTX}^2 + A_{OUTY}^2)}] + 1 \text{ g times } \sin\{(A_{OUTY}/A_{OUTX}) - (A_{OUTY0}/A_{OUTX0})\}.$$

For a horizontal mounting orientation, the first vector sum formula given above becomes:

$$\text{Deceleration} = [[\{]]\sqrt{(A_{OUTX}^2 + A_{OUTZ}^2)}] + 1 \text{ g times } \sin\{\arctan(A_{OUTZ}/A_{OUTX}).$$

The other vector sum formulas are modified in a similar manner for a horizontal mounting orientation.

As described above, the particular acceleration sensor used includes a temperature sensor. Accordingly, the above formula may be modified to include compensation for temperature effects upon the accelerometer sensitivity. The temperature compensated formula is as follows:

$$\text{Deceleration} = [[\{]]\sqrt{(A_{OUTX}^2 + A_{OUTY}^2)}]\text{times}[(T_{OUT} + tc)/297] + 1 \text{ g times } \sin\{\arctan(A_{OUTY}/A_{OUTX}) - \arctan(A_{OUTY0}/A_{OUTX0})\}, \text{ where}$$

$T_{OUT}$ is the output of the accelerometer temperature sensor, and tc is a unit conversion term.

The above temperature compensated formula requires initial temperature testing of the controller to calculate the unit conversion term, tc, which is then stored in the MPU memory. Accordingly, the first set of formula presented above are preferred since they do not require temperature compensation.

In conclusion, the two axis accelerometer 204 provides superior performance over a single axis accelerometer since the output of the later sensor decreases in both magnitude and accuracy as the single sensor axis approaches the vertical. This sensitivity to mounting angle encountered with a single axis accelerometer is avoided by using the two axis accelerometer shown in FIG. 14.

Figure 15:
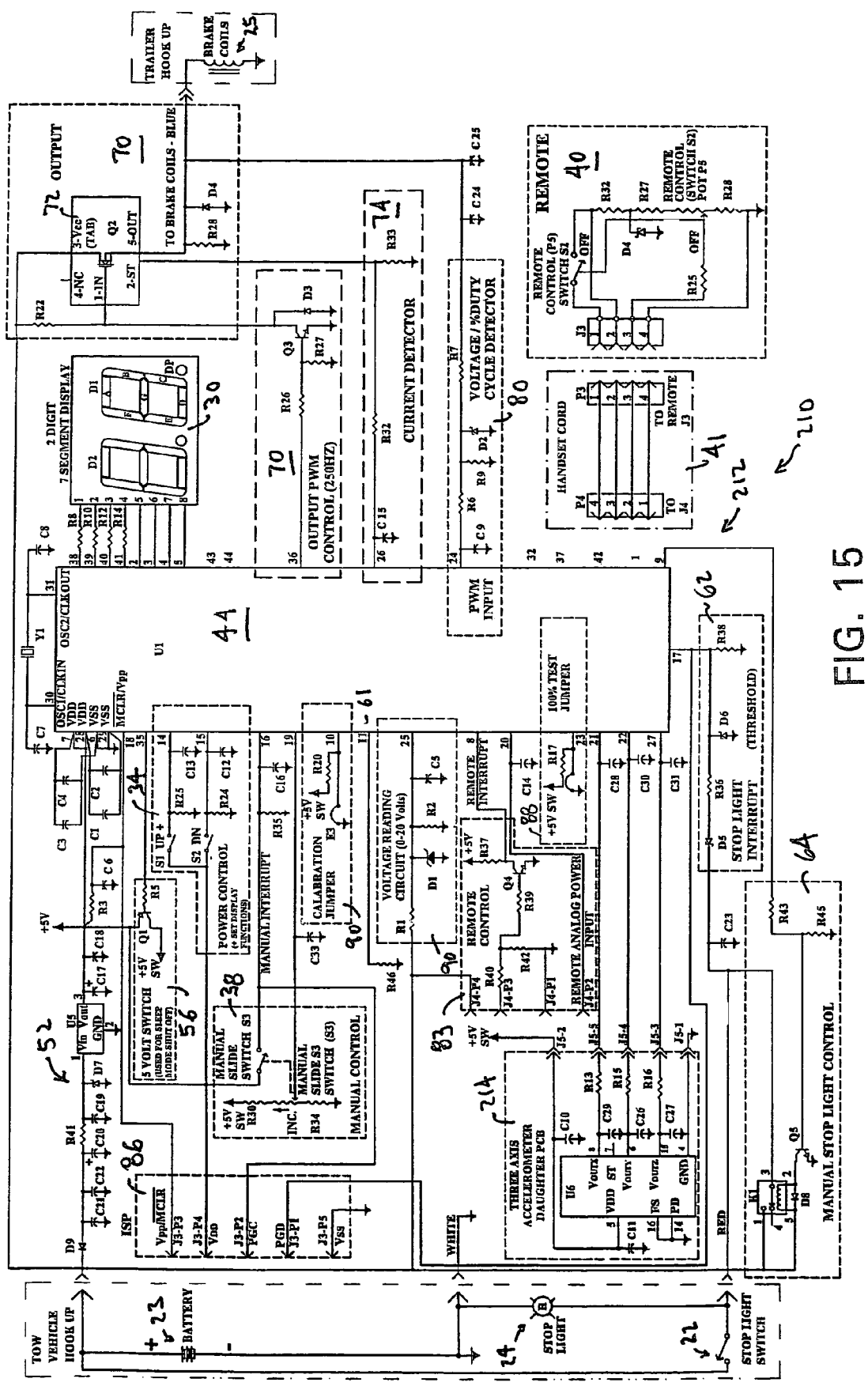
FIG. 15 is a circuit diagram for the brake controller shown in FIG. 13 that includes a three axis accelerometer.

The present invention contemplates another embodiment of the controller 210 that includes a three axis accelerometer. The circuit for a three axis accelerometer brake controller 210 is shown generally at 212 in FIG. 15, where components that are similar to components shown in Figure. FIG. 14 have the same numerical identifiers. The circuit 212 includes a three axis accelerometer 214 that has a third sensor device for sensing acceleration of the towing vehicle along an axis perpendicular to the sensing plane defined by the first and second sensor devices described above. The third sensor device generates deceleration signal, which is identified as $A_{OUTZ}$ and is supplied via the line labeled J5-3 to the MPU 44. Note that the third sensor signal replaces the temperature signal TOUT shown in FIG. 14. As described above, the two axis accelerometer 204 may be mounted with the sensing plane defined by the first and second sensor axes either in a vertical orientation aligned with the towing vehicle direction of travel, or in a horizontal orientation. However, for the vertical mounting option, while the controller with the two axis accelerometer compensates for any under dash mounting angle or road inclination, there is no compensation for deviation of the mounting from the direction of travel of the towing vehicle. Similarly, for the horizontal mounting option, while the controller with the two axis accelerometer would compensate for deviation of the mounting from the direction of travel, there would be no compensation for road inclination.

The controller with the three axis accelerometer 214 provides compensation for the above potential error sources. When the controller with the three axis sensor is mounted with the sensing plane of the first and second sensors in a vertical orientation and aligned with the direction of travel of the towing vehicle, the third axis is generally aligned in a transverse direction relative to the towing vehicle. In such an orientation, the deceleration sensed along the third axis provides a compensating component to correct any misalignment of the sensing plane of the first and second axes from the direction of travel of the towing vehicle. Similarly, if the controller with the three axis sensor is mounted with the sensing plane of the first and second sensors in a generally horizontal orientation, the third sensing axis will be in a generally vertical orientation. In such an orientation, the deceleration sensed along the third axis provides a compensating component to correct any misalignment of the sensing plane of the first and second axes from the horizontal and/or for any inclination of the road.

In the preferred embodiment, the three axis accelerometer 214 is a LIS3L02AQ three axis inertial sensor supplied by Future Electronics in Huntsville, Ala.; however, other available three axis accelerometers also may be utilized. In the preferred embodiment, the instantaneous deceleration of the towing vehicle is calculated by the algorithm in two steps. First, two intermediate decelerations are calculated by the algorithm from the following formulas:

$$\text{Deceleration}(X,Y) = 1 \text{ g times } \arctan(A_{OUTY}/A_{OUTX}),$$
and $$\text{Deceleration}(Y,Z) = 1 \text{ g times } \arctan(A_{OUTY}/A_{OUTZ}),$$
where g = the force of gravity,
$A_{OUTY}$ is the output of the second sensor device,
$A_{OUTX}$ is the output of the first sensor device,
$A_{OUTZ}$ is the output of the third sensor device,
$\arctan(A_{OUTY}/A_{OUTX})$ is the angle between the controller and a horizontal plane in radian degrees, and
$\arctan(A_{OUTY}/A_{OUTZ})$ is the angle between the controller and a vertical plane in radian degrees.

The above two intermediate decelerations are then used in a second step by the algorithm to calculate an instantaneous towing vehicle deceleration from the following formula:

$$\text{Deceleration}(X,Y,Z) = 1 \text{ g times } \arctan(\text{Deceleration}(X,Y)/\text{Deceleration}(Y,Z)).$$

The above relationship automatically compensates for any inclination of the road and would be applicable if the controller 200 were mounted with the X and Y axes in a vertical plane within the towing vehicle and the X axis parallel to the longitudinal axis of the towing vehicle. However, the controller 200 is usually mounted below the towing vehicle dashboard at angle to the horizontal and the Z axis may be offset from the towing vehicle transverse axis. Accordingly, in the preferred embodiment, the MPU 44 includes a mounting angle correction, which modifies the intermediate deceleration formulas as follows:

$$\text{Deceleration}(X,Y)' = 1 \text{ g times } \{\arctan(A_{OUTY}/A_{OUTX}) - \arctan(A_{OUTY0}/A_{OUTX0})\}, \text{ and}$$

$$\text{Deceleration}(Y,Z)' = 1 \text{ g times } \{\arctan(A_{OUTY}/A_{OUTZ}) - \arctan(A_{OUTY0}/A_{OUTZ0})\}, \text{ where}$$

g = the force of gravity,
$A_{OUTY}$ is the output of the second sensor device,
$A_{OUTX}$ is the output of the first sensor device,
$A_{OUTZ}$ is the output of the third sensor device,
$\arctan(A_{OUTY}/A_{OUTX})$ is the angle between the controller and a horizontal plane in radian degrees.
$\arctan(A_{OUTY}/A_{OUTZ})$ is the angle between the accelerometer Z axis and the transverse axis of the towing vehicle in radian degrees.
$A_{OUTY0}$ is the "zero" output of the second sensor device,
$A_{OUTX0}$ is the "zero" output of the first sensor device,
$A_{OUTZ0}$ is the "zero" output of the third sensor device,
$\arctan(A_{OUTY0}/A_{OUTX0})$ is the mounting angle between the controller and a horizontal plane in radian degrees, and
$\arctan(A_{OUTY0}/A_{OUTZ0})$ is the offset angle between the accelerometer Z axis and the transverse axis of the towing vehicle in radian degrees.

In the above formulas, the second arctangent terms compensate the instantaneous intermediate deceleration reading for the tilt from horizontal due to the controller mounting angle and any offset from the towing vehicle transverse axis. The above compensated intermediate decelerations are then used in a second step by the algorithm to calculate an instantaneous towing vehicle deceleration from the following formula:

$$\text{Deceleration}(X,Y,Z)' = 1 \text{ g times } \arctan(\text{Deceleration}(X,Y)'/\text{Deceleration}(Y,Z)'.$$

As before, the controller 210 is calibrated for the compensating angles. The controller 210 is either manually calibrated by depressing the two pushbuttons 32 and 34 for a predetermined period of time or automatically calibrated by a rolling average calculation, as described above for the two-axis controller 200.

While the above intermediate formulas were presented as using the ratios of $A_{OUTY}/A_{OUTX}$ and $A_{OUTY}/A_{OUTZ}$, it will be appreciated that the invention also may be practiced using other ratios of the decelerations for computing the intermediate decelerations. For example, the ratios of $A_{OUTY}/A_{OUTZ}$ and $A_{OUTZ}/A_{OUTX}$ may also be used in the above intermediate deceleration formulas.

From the above description, it is apparent that the three axis accelerometer 214 provides a further enhancement over the two axis accelerometer 204 shown in the circuit diagram of FIG. 14 for the previously described brake controller 200. The enhancement is that the controller 214 may be mounted at any angle beneath the towing vehicle dashboard without any need to calibrate or zero the controller.

While the above formulas are applicable for any controller mounting angle, the invention also contemplates simplified versions of the formulas that may be used when the mounting angle is less than 45 degrees. Thus, when the vertical plane mounting angle is less than 45 degrees from the towing vehicle longitudinal, or the horizontal mounting is within 45 degrees of a horizontal plane, the arctangent may be approximated by the ratio of the sensor device output, in which case the instantaneous deceleration formulas become simply:

$$\text{Deceleration}(X,Y) = 1 \text{ g times } (A_{OUTY}/A_{OUTX}), \text{ and}$$

$$\text{Deceleration}(Y,Z) = 1 \text{ g times } (A_{OUTY}/A_{OUTZ}),$$

and the instantaneous deceleration formula becomes simply:

$$\text{Deceleration}(X,Y,Z) = 1 \text{ g times } (\text{Deceleration}(X,Y)/\text{Deceleration}(Y,Z)).$$

The above formulas would be applicable when a less powerful MPU is utilized. As before, the invention also contemplates using other ratios of the decelerations than the ones shown above. Additionally, the above formulas may be modified for mounting angles within the towing vehicle in a similar manner as described above for the two axis accelerometer 204.

The present invention also contemplates using a vector sum of the sensor device outputs, with the intermediate decelerations being calculated with following two formulas:

$$\text{Deceleration}(X,Y) = \sqrt{(A_{OUTX}^2 + A_{OUTY}^2)} \mid +1 \text{ g times } (A_{OUTY}/A_{OUTX}), \text{ and}$$

$$\text{Deceleration}(Z,Y) = \sqrt{(A_{OUTZ}^2 + A_{OUTY}^2)} \mid +1 \text{ g times } (A_{OUTZ}/A_{OUTX}), \text{ where the formula terms are as described above}$$

The instantaneous towing vehicle deceleration is then calculated from:

$$\text{Deceleration}(X,Y,Z) = \{\sqrt{(\text{Deceleration}(X,Y)^2 + \text{Deceleration}(Y,Z)^2)} \mid +1 \text{ g times}[\text{Deceleration}(X,Y)/\text{Deceleration}(Y,Z)]$$

Again, the above formulas may be modified in a manner similar to the two axis accelerometer 204 to compensate for mounting angles within the towing vehicle.

Similar to the previously described controller 170, the alternate embodiment controllers 200 and 210 include a manual brake slide lever 38 and an optional remote manual brake control 40 that override the brake control signal generated by accelerometers 204 and 214 upon either of their outputs exceeding the accelerometer output. The controllers 200 and 210 also includes a digital display 30 for displaying operating parameters and error codes, as described above and illustrated in FIG. 7 and improved short circuit and current limit circuits.

The accelerometer equipped controllers 200 and 210 are preset with default values of 10% and 50% for minimum and maximum, respectively, brake power delivery. Thus, upon initial application of the towing vehicle brakes, the controller will cause at least 10% of the available output power to be delivered to the trailer brake coils 25, even if there is no brake control signal generated by the accelerometer. When the accelerometer generates a brake control signal that exceeds the minimum power setting, the controller will begin increasing the power supplied to the brake coils 25. However, the pushbuttons 32 and 34 may be selectively depressed to select minimum and maximum limits for the output power supplied to the brake coils 19, again as described above. Thus, the maximum power setting may be increased in 5% increments from 50% to 100%. The setting will be shown upon the display 30, with the 100% power level shown as 99%. The output power supplied by either of the controllers 200 or 210 are multiplied by the maximum power setting value, as illustrated by the following formula:

Output Power=Controller Calculated Power*maximum power setting as a percentage, where the Controller Calculated Power represents the power that would be supplied by the controller for a sensed deceleration.

Figure 16:
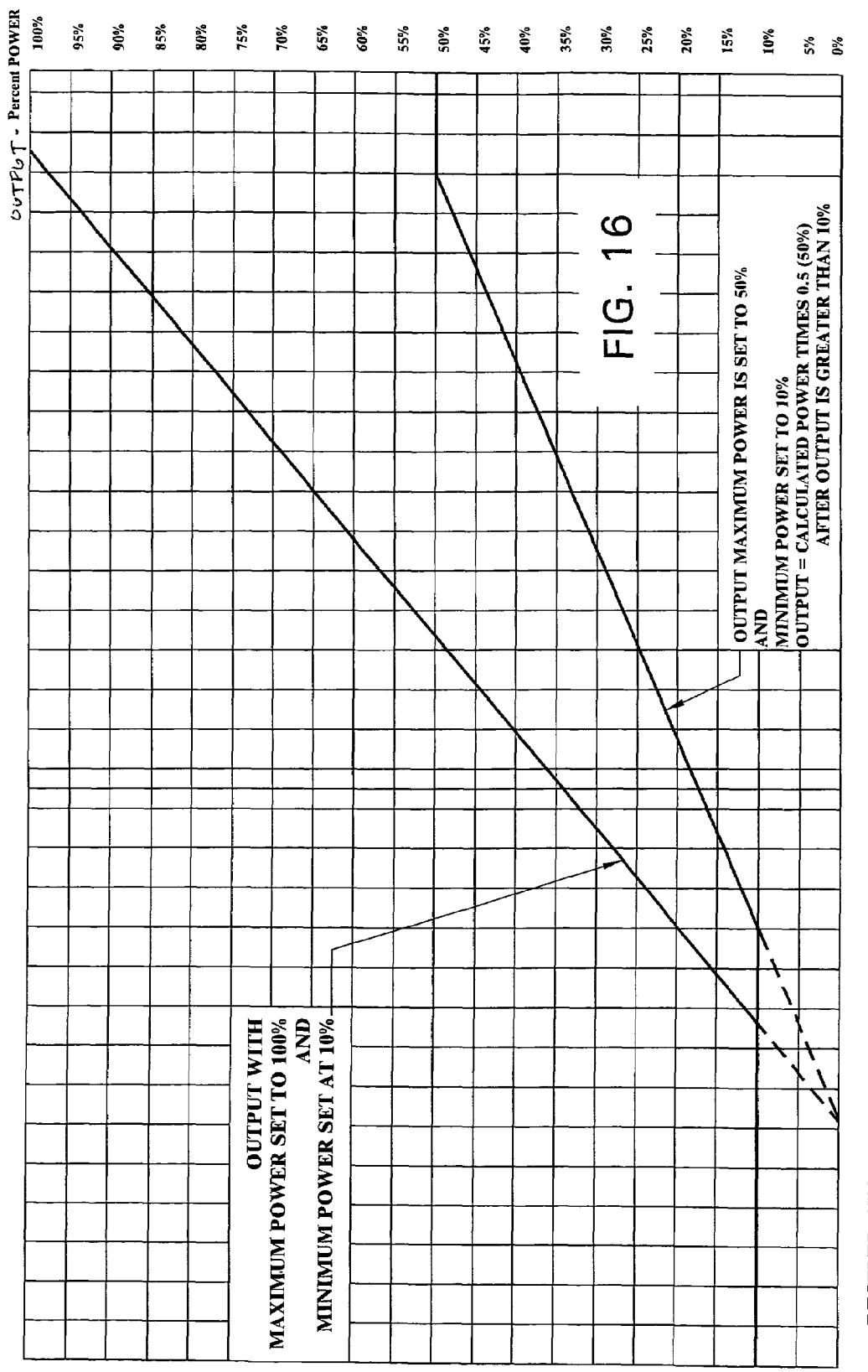
FIG. 16 illustrates the effect of the adjustment of the maximum power output upon an output power curve for the brake controllers shown in FIGS. 14 and 15.

The above relationship is illustrated in FIG. 16 where two output power curves for the controllers 200 and 210 are shown. In FIG. 16, the vertical axis represents the output power supplied by either controller to the brake coils 25 while the horizontal axis represents the deceleration of the towing vehicle sensed by the accelerometer 204 or 214, respectively. In FIG. 16, the upper curve represents a maximum power setting of 100% and a minimum power setting of 10% while the lower curve represents a maximum power setting of 50% and a minimum power setting of 10%. Thus, as illustrated in FIG. 16, adjustment of the maximum power setting from 100% to 50% limits the maximum power output to 50% of the maximum power available from the controller while also proportionally decreasing the slope of the output power curve. The adjustment of the maximum power setting allows the towing vehicle operator to adjust the trailer braking capability to match the load being carried with a higher setting being selected for a loaded trailer and a lower setting be selected for an empty trailer.

Similarly, the minimum power setting may be increased from 10% to 35% in 5% increments, by selectively depressing the pushbuttons 32 and 34, with the setting again shown on the display 30. When the minimum power setting is increased, the curve of brake output power vs. deceleration of the towing vehicle is shifted in an upward direction. The shifting is illustrated in FIG. 17, where the output curves for 10%. 15%, 20% and 25% minimum power settings are shown. In FIG. 17, the vertical axis again represents the output power supplied by either controller 200 or 210 to the brake coils 25 while the horizontal axis represents the deceleration of the towing vehicle sensed by the accelerometer 204 or 214, respectively. While the curves for a minimum setting of 30% and 35% are not shown in FIG. 17, they would be similar to the curves shown. As shown in FIG. 17, when the minimum setting is indexed by five percent, the corresponding output power curves are indexed by 10% between the ramps. As described above, the curves are also limited, or capped, by the maximum setting. Also, the slopes of the curves are a function of the maximum setting. Thus, while the curves are shown extending to a 100% output value, that maximum and the slope of the curve may be reduced by setting the maximum output level, as described above. For example, if the maximum output were adjusted at 80%, the output curves would become a horizontal line upon reaching the 80% value and the slope would be decreased proportionally (not shown). However, it is clear that higher minimum settings cause more aggressive braking. It will be noted that the output curves are linear functions of the deceleration. In contrast, upper and lower bounds for the output generated by a controller utilizing pendulum type device to detect deceleration are also included in FIG. 17. It will be noted that the output of the controller with the pendulum type device is not only non-linear, but the output range is much more limited than what is shown by the curves for the accelerometer based controllers 200 and 210.

Additionally, the minimum setting also may be reduced to a displayed value of 5, where the numerical display indicates the setting, but not the power level. When this setting is selected, the minimum power level delivered to the brake coils 25 for both automatic and manual brake applications remains at 10%, but the application of the trailer brakes is delayed. Also, when the controller is operating in the automatic mode, all power outputs greater than 10% will be reduced by a small percentage. The resulting minimum output curve is illustrated in FIG. 17, where the delay results in shifting of the output power curve to the right. The minimum output power curve allows adjustment of brake application power when very light loads are being carried, such as, for example, a ski-do or a lawn mower. The inventor believes that the selectable minimum power output setting is unique within the industry for the controllers 200 and 210. The selected minimum and maximum power level values are permanently stored in the EEPROM 48. The remaining portions of the controller circuits 202 and 212 are the same and function as the same described above for the time based controller 171. Also, it will be appreciated that, while the preferred embodiments of the controllers 200 and 210 have been illustrated and described as providing power to electric trailer brakes, the controllers also may be utilized to supply power to hydraulic brake acutuators.

The present invention also may be practiced utilizing other output power curves than those shown in FIG. 17. For example, in FIG. 18, selected output curves have been grouped together to reduce the overall output range of the controller. As can be seen, while the minimum power setting for 15 and 20% curves is increased, the ramp portions of the curves are combined with the ramp portion of the 10% curve for values above the minimum, while the 25% and 5 settings retain their unique output ramps. Alternately, the ramp portion of the 25% curve also may be combined with the ramp portion of the 10% curve (not shown). In a like manner, the 15% and 20% curve ramps may be combined with other curve ramps than those shown in FIG. 18. The outputs shown in FIG. 18 are obtained by simply changing the coding in the algorithm stored in the MPU 44. While the output curves for minimum settings of 30% and 35% are not shown in FIG. 18, they may also be treated in a similar manner.

The use of the MPU 44 in the above controller circuits 36, 171, 202 and 212 aids calibration and thus provides improved performance from the brake controllers 11, 170, 200 and 210 perform better. The MPU 44 in each of the controllers described above can be calibrated to read the minimum input when the manual slide lever 38 is initially moved and the maximum at the end limit of the manual travel. This ensures that the output is controlled by the full travel of the slide pot. Previously known controllers could reach 100% output by the middle of the manual travel. The same feature also applies to the remote manual control 40, when the controllers 200 and 210 are so equipped. The controllers 36, 170, 200 and 210 are much more linear and have better response. Previously known controllers were not linear and could work more like a switch, which is undesirable. The use of the MPU 44 to calibrate the automatic output also makes the automatic output more linear and ensures consistently between the entire controllers.

The invention also contemplates that the MPU 44 is used for manufacturing testing of the controllers before shipment to the sale outlets. This ensures every mode of controller operation is tested correctly and the correct results are obtained. The test mode always sets the controllers to the default display mode, the default maximum power level, minimum turn-on and or output ramp time. Operators could forget to set one or more of these modes or set them an incorrect level.

As described above, all of the controllers use two push buttons to increase and decrease the maximum power level. These same buttons also may be used by the end user to set all of the changeable features of the controllers 200 and 210. All values set by the end user is stored in EEPROM and will not be lost if the battery is disconnected.

The principle and mode of operation of this invention have been explained and illustrated in its preferred embodiment. However, it must be understood that this invention may be practiced otherwise than as specifically explained and illustrated without departing from its spirit or scope. For example, while the preferred embodiment has been illustrated and described for operation a pair of towed vehicle brakes, it will be appreciated that invention also may be practiced to control more than two such brakes. The invention contemplates that the controllers 11 and 170 may be used to control two to eight towed vehicle brakes, although more than eight also may be controlled.

What is claimed is:

1. A trailer brake controller comprising:
   a two axis accelerometer that includes first and second sensor devices for sensing deceleration along first and second axes, said second axis being perpendicular to said first axis, and said accelerometer operative to generate a pair of deceleration signals that are a function of a towing vehicle deceleration;
   a microprocessor connected to said accelerometer and responsive to said deceleration signals to generate an output brake actuation signal which is related to said pair of deceleration signals, said microprocessor operative to combine said deceleration signals in accordance with the following formula:

Deceleration=1 g times $\arctan(A_{OUTY}/A_{OUTX})$, where g=the force of gravity,
   $A_{OUTY}$ is the output of said second sensor device,
   $A_{OUTX}$ is the output of said first sensor device, and
   $\arctan(A_{OUTY}/A_{OUTX})$ is the angle between the controller and a reference plane in radian degrees, and
   at least one pushbutton connected to said microprocessor, said pushbutton being operative to change selected operating parameters of said microprocessor.

2. The trailer brake controller according to claim 1 further including a compensating factor in accordance with the following formula:

Deceleration=1 g times{$\arctan(A_{OUTY}/A_{OUTX})-\arctan(A_{OUTY0}/A_{OUTX0})$}, where
   g=the force of gravity,
   $A_{OUTY}$ is the output of said second sensor device,
   $A_{OUTX}$ is the output of said first sensor device,
   $\arctan(A_{OUTY}/A_{OUTX})$ is the angle between the controller and said reference plane plane in radian degrees,
   $A_{OUTY0}$ is the "zero" output of said second sensor device,
   $A_{OUTX0}$ is the "zero" output of said first sensor device, and
   $\arctan(A_{OUTY0}/A_{OUTX0})$ is a mounting angle between the controller and said reference plane in radian degrees.

3. The trailer brake controller according to claim 2 further including a power switch which is adapted to be connected between a power supply and a set of trailer brake coils, said power switch also connected to an output pin of said microprocessor and responsive to said brake control signal to supply power to said trailer brake coils that is a function of said brake control signal.

4. The trailer brake controller according to claim 3 wherein said power supplied by said power switch to said trailer brake coils is bounded by a minimum limit and a maximum limit.

5. The trailer brake controller according to claim 4 including a pair of pushbuttons that are selectively operative to select said minimum and maximum brake power limits.

6. The trailer brake controller according to claim 5 wherein adjustment of said maximum brake power limit adjusts the maximum power to be delivered to said brake coils and also adjusts the slope of a brake power output curve that relates the power delivered to said trailer brake coils to the deceleration sensed by said accelerometer.

7. The trailer brake controller according to claim 6 wherein adjustment of said minimum brake power limit adjusts the minimum power to be delivered to said trailer brake coils and also vertically shifts said brake power output curve.

8. The trailer brake controller according to claim 7 wherein at least one minimum brake power limit adjustment supplies a minimum power to said brake coils while also delaying application of increased brake power in accordance with said output curve.

9. The trailer brake controller according to claim 3 wherein said microprocessor includes an internal ROM that stores coding for an algorithm that controls the operation of the brake controller and further wherein said microprocessor also includes an internal BEPROM that receives and stores said selected minimum and maximum brake power limits.

10. The trailer brake controller according to claim 9 further including a visual display, said microprocessor being operative to monitor parameters within the trailer brake circuit and, upon detection of a problem, to illuminate said display to inform the operator of the towing vehicle of the problem.

11. The trailer brake controller according to claim 10 wherein said microprocessor is further operative to monitor output parameters of the controller and further wherein selective manipulation of said pushbuttons will display a selected parameter to the operator of the towing vehicle.

12. The trailer brake controller according to claim 11 wherein said selected parameter is one of percent controller power output, controller voltage output and controller current output.

13. The trailer brake controller according to claim 12 wherein said selected parameter is stored in said microprocessor EEPROM.

14. The trailer brake controller according to claim 3 wherein said power switch is a programmable current sensing power switch.

15. The trailer brake controller according to claim 14 wherein said power switch is also connected to a current feedback port of said microprocessor, said microprocessor being operative to monitor the current being supplied to said trailer brake coils and being further operative, upon the brake coil current exceeding a predetermined threshold, to cause said power switch to change to a non-conducting state for a predetermined period of time.

16. The trailer brake controller according to claim 2 wherein said zero outputs are calculated from a rolling weighted average of sensor outputs by said microprocessor in accordance with a stored algorithm.

17. The trailer brake controller according to claim 16 wherein said rolling weighted average of sensor outputs begins with initial sensor output values sensed upon an initial brake application.

18. The trailer brake controller according to claim 2 wherein said zero outputs are initially set for the controller by depressing said pushbutton, said zero outputs being stored by said microprocessor.

19. The trailer brake controller according to claim 1 wherein said reference plane is vertical.

20. The trailer brake controller according to claim 1 wherein said reference plane is horizontal.

21. A trailer brake controller comprising:
a multi-axis accelerometer that generates a plurality of deceleration signals;
a microprocessor connected to said accelerometer and responsive to said deceleration signals to generate a pulse width modulated output brake actuation signal which has a variable duty cycle, said output brake actuation signal having an initial duty cycle value that is greater than zero, said duty cycle being subsequently varied in direct proportion to said deceleration signals up to a maximum duty cycle value;
an output power circuit having an input connected to said microprocessor and an output adapted to be connected to at least one electric trailer brake, said output power circuit responsive to said output brake actuation signal to automatically supply power to said at least one electric trailer brake at an initial power level that corresponds to said output brake actuation signal initial duty cycle and subsequently at a power level that is directly proportional to said output brake actuation signal duty cycle up to a maximum power level corresponding to said maximum output brake actuation signal duty cycle; and
at least one pushbutton connected to said microprocessor, said pushbutton being operative to set at least one of a minimum duty cycle for said output brake actuation signal and a maximum duty cycle for said output brake actuation signal.

22. The trailer brake controller according to claim 21 wherein said multi-axis accelerometer is a two axis accelerometer that includes first and second sensor devices for sensing deceleration along first and second axes, said second axis being perpendicular to said first axis, and further wherein said accelerometer generates a pair of deceleration signals that are a function of a towing vehicle deceleration.

23. The trailer brake controller according to claim 21 wherein said multi-axis accelerometer is a three axis accelerometer that includes first, second and third sensor devices for sensing deceleration along first, second and third axes, said second axis being perpendicular to said first axis, and said third axis being perpendicular to a plane defined by said first and second axes, and further wherein said accelerometer generates a three deceleration signals that are a function of the deceleration of a towing vehicle.

24. A trailer brake controller comprising:
a two axis accelerometer that includes first and second sensor devices for sensing deceleration along first and second axes, said second axis being perpendicular to said first axis, and said accelerometer operative to generate a pair of deceleration signals that are a function of a towing vehicle deceleration;
a microprocessor connected to said accelerometer and responsive to said pair of deceleration signals to generate an output brake actuation signal which is related to said pair of deceleration signals, said microprocessor operative to combine said deceleration signals in accordance with the following formula:

$$\text{Deceleration} = [[\{]]\sqrt{(A_{OUTX}^2 + A_{OUTY}^2)}|1 \text{ g times sin} \{\arctan(A_{OUTY}/A_{OUTX}) - \arctan(A_{OUTY0}/A_{OUTX0})\}],$$

where:
g=the force of gravity,
$A_{OUTY}$ is the output of said second sensor device,
$A_{OUTX}$ is the output of said first sensor device,
$\arctan(A_{OUTY}/A_{OUTX})$ is the angle between the controller and a reference plane in radian degrees, and
sin represents the sine of the angle determined within the brackets; and
at least one pushbutton connected to said microprocessor, said pushbutton being operative to change selected operating parameters of said microprocessor.

25. A trailer brake controller comprising:
a three axis accelerometer that includes first, second and third sensor devices for sensing deceleration along first, second and third axes, said second axis being perpendicular to said first axis, and said third axis being perpendicular to a plane defined by said first and second axes, said accelerometer operative to generate three deceleration signals that are a function of the deceleration of a towing vehicle;
a microprocessor connected to said accelerometer and responsive to said three deceleration signals to generate an output brake actuation signal which is related to said pair of deceleration signals, said microprocessor operable to combine said deceleration signals in accordance with the following formulas:

$$\text{Deceleration}(X,Y) = 1 \text{ g times } \arctan(A_{OUTY}/A_{OUTX}),$$
and $$\text{Deceleration}(Y,Z) = 1 \text{ g times } \arctan(A_{OUTY}/A_{OUTZ}),$$

$$\text{Deceleration}(X,Y,Z) = 1 \text{ g times } \arctan(\text{Deceleration}(X,Y)/\text{Deceleration}(Y,Z)),$$

where:
g=the force of gravity,
$A_{OUTY}$ is the output of said second sensor device,
$A_{OUTX}$ is the output of said first sensor device,
$A_{OUTX}$ is the output of said third sensor device,
$\arctan(A_{OUTY}/A_{OUTX})$ is an angle between the controller and a horizontal plane in radian degrees, and
$\arctan(A_{OUTY}/A_{OUTZ})$ is an angle between the controller and a vertical plane in radian degrees; and at least one pushbutton connected to said microprocessor, said pushbutton being operative to change selected operating parameters of said microprocessor.

26. A trailer brake controller comprising:

a three axis accelerometer that includes first, second and third sensor devices for sensing deceleration along first, second and third axes, said second axis being perpendicular to said first axis, and said third axis being perpendicular to a plane defined by said first and second axes, said accelerometer operative to generate three deceleration signals that are a function of the deceleration of a towing vehicle;

a microprocessor connected to said accelerometer and responsive to said three deceleration signals to generate an output brake actuation signal which is related to said pair of deceleration signals, said microprocessor operable to combine said deceleration signals in accordance with the following formulas:

Deceleration$(X,Y) = [\sqrt{(A_{OUTX}^2 + A_{OUTY}^2)} + 1$ g times $(A_{OUTY}/A_{OUTX})$, Deceleration$(Z,Y) = [\sqrt{(A_{OUTZ}^2 + A_{OUTY}^2)} + 1$ g times $(A_{OUTZ}/A_{OUTX})$, and Deceleration$(X,Y,Z) = \{[\sqrt{(Deceleration(X,Y)^2 + Deceleration(Y,Z)^2)} + 1$ g times[Deceleration$(X,Y)$/Deceleration$(Y,Z)]$, where:

g = the force of gravity, $A_{OUTY}$ is the output of said second sensor device, $A_{OUTX}$ is the output of said first sensor device, $A_{OUTX}$ is the output of said third sensor device, arctan($A_{OUTY}/A_{OUTX}$) is an angle between the controller and a horizontal plane in radian degrees, and arctan($A_{OUT}Y/A_{OUTZ}$) is an angle between the controller and a vertical plane in radian degrees; and at least one pushbutton connected to said microprocessor, said pushbutton being operative to change selected operating parameters of said microprocessor.

* * * * *

UNITED STATES PATENT AND TRADEMARK OFFICE
CERTIFICATE OF CORRECTION

PATENT NO. : 7,311,364 B2  Page 1 of 1
APPLICATION NO. : 11/048579
DATED : December 25, 2007
INVENTOR(S) : Charles L. Robertson It is certified that error appears in the above-identified patent and that said Letters Patent is hereby corrected as shown below:

Column 28, Claim 9, Line 50, delete "BEPROM" and insert --EEPROM--.

Column 30, Claim 24, Line 21, delete
"Deceleration = [[{]]√($A_{OUTX}^2 + A_{OUTY}^2$)| 1g" and insert
--Deceleration = [[{]]√($A_{OUTX}^2 + A_{OUTY}^2$)| + 1g--.

Column 32, Claim 26, Line 14, delete "arctan($A_{OUT}Y / A_{OUTX}$)" and insert
--arctan($A_{OUTY} / A_{OUTX}$)--.

Signed and Sealed this

Twenty-ninth Day of April, 2008

JON W. DUDAS
*Director of the United States Patent and Trademark Office*